(12) United States Patent
Ando

(10) Patent No.: US 12,223,714 B2
(45) Date of Patent: Feb. 11, 2025

(54) OBJECT CLASSIFICATION METHOD, VEHICLE CONTROL METHOD, INFORMATION DISPLAY METHOD, AND OBJECT CLASSIFICATION DEVICE

(71) Applicant: Panasonic Intellectual Property Management Co., Ltd., Osaka (JP)

(72) Inventor: Takamasa Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 806 days.

(21) Appl. No.: 17/169,350

(22) Filed: Feb. 5, 2021

(65) Prior Publication Data

US 2021/0158108 A1 May 27, 2021

Related U.S. Application Data

(63) Continuation of application No. PCT/JP2019/037200, filed on Sep. 24, 2019.

(30) Foreign Application Priority Data

Oct. 15, 2018 (JP) .................................. 2018-194149

(51) Int. Cl.
*G06T 7/00* (2017.01)
*G06F 18/214* (2023.01)
(Continued)

(52) U.S. Cl.
CPC ............ *G06V 20/20* (2022.01); *G06F 18/214* (2023.01); *G06F 18/2411* (2023.01);
(Continued)

(58) Field of Classification Search
CPC ........ G06V 20/20; G06V 20/56; G06V 20/68; G06V 10/147; G06V 10/17; G06V 10/20;
(Continued)

(56) References Cited

U.S. PATENT DOCUMENTS

2003/0189646 A1* 10/2003 Bean .................. H04N 1/00204
348/207.99
2011/0200237 A1 8/2011 Nakamura et al.
(Continued)

FOREIGN PATENT DOCUMENTS

JP 2015-501432 1/2015
JP 2016-156801 A 9/2016
(Continued)

OTHER PUBLICATIONS

Cavigelli, Lukas, Dominic Bernath, Michele Magno, and Luca Benini. "Computationally efficient target classification in multispectral image data with Deep Neural Networks." In Target and Background Signatures II, vol. 9997, pp. 191-202. SPIE, 2016. (Year: 2016).*
(Continued)

*Primary Examiner* — Carol Wang
(74) *Attorney, Agent, or Firm* — Rimon P.C.

(57) ABSTRACT

An object classification method includes: acquiring image data of an image including feature information indicating a feature of an object; and classifying the object included in the image, based on the feature information. The image data is acquired by causing a first image capture device to capture the image. The first image capture device includes: an image sensor; and a filter array that is arranged on an optical path of light that is incident on the image sensor and that includes translucent filters two-dimensionally arrayed along a plane that crosses the optical path, the translucent filters including two or more filters in which wavelength dependencies of light transmittances are different from each other, and light transmittance of each of the two or more filters having local maximum values in a plurality of wavelength ranges.

12 Claims, 19 Drawing Sheets

(51) Int. Cl.
| | |
|---|---|
| *G06F 18/2411* | (2023.01) |
| *G06N 20/00* | (2019.01) |
| *G06T 7/70* | (2017.01) |
| *G06V 10/10* | (2022.01) |
| *G06V 10/147* | (2022.01) |
| *G06V 10/20* | (2022.01) |
| *G06V 10/764* | (2022.01) |
| *G06V 10/774* | (2022.01) |
| *G06V 10/776* | (2022.01) |
| *G06V 20/20* | (2022.01) |
| *G06V 20/56* | (2022.01) |
| *G06V 20/68* | (2022.01) |

(52) U.S. Cl.
CPC ............... *G06N 20/00* (2019.01); *G06T 7/70* (2017.01); *G06T 7/97* (2017.01); *G06V 10/147* (2022.01); *G06V 10/17* (2022.01); *G06V 10/20* (2022.01); *G06V 10/764* (2022.01); *G06V 10/7753* (2022.01); *G06V 10/776* (2022.01); *G06V 20/56* (2022.01); *G06T 2207/10024* (2013.01); *G06T 2207/10036* (2013.01); *G06T 2207/30248* (2013.01); *G06V 20/68* (2022.01)

(58) Field of Classification Search
CPC ............ G06V 10/764; G06V 10/7753; G06V 10/776; G06F 18/214; G06F 18/2411; G06F 18/2431; G06N 20/00; G06N 3/08; G06T 7/70; G06T 7/97; G06T 2207/10024; G06T 2207/10036; G06T 2207/30248; G01J 2003/2826
See application file for complete search history.

(56) References Cited

U.S. PATENT DOCUMENTS

| | | | |
|---|---|---|---|
| 2015/0276478 A1 | 10/2015 | Geelen et al. | |
| 2016/0138975 A1 | 5/2016 | Ando et al. | |
| 2017/0003168 A1 | 1/2017 | Fujii et al. | |
| 2017/0076438 A1 | 3/2017 | Kottenstette et al. | |
| 2017/0163901 A1 | 6/2017 | Lin et al. | |
| 2017/0337669 A1 | 11/2017 | Kawai et al. | |
| 2019/0162596 A1* | 5/2019 | Fujii | G01J 3/2803 |
| 2019/0347467 A1* | 11/2019 | Ohsaka | G06F 18/2431 |
| 2019/0370586 A1 | 12/2019 | tsuki | |
| 2020/0019165 A1* | 1/2020 | Levandowski | G06V 10/82 |
| 2020/0097753 A1* | 3/2020 | Ash | G06V 10/60 |
| 2021/0313359 A1* | 10/2021 | Ishikawa | H01L 27/14645 |
| 2021/0318171 A1* | 10/2021 | Inada | G01J 3/2823 |
| 2021/0325246 A1* | 10/2021 | Fujii | G01S 17/88 |
| 2021/0341657 A1* | 11/2021 | Ishikawa | G02B 5/285 |
| 2024/0077359 A1* | 3/2024 | Inada | G01J 3/2823 |

FOREIGN PATENT DOCUMENTS

| | | | |
|---|---|---|---|
| JP | 2017-091186 | 5/2017 | |
| JP | 2018-096834 | 6/2018 | |
| WO | 2010/044250 | 4/2010 | |
| WO | 2015/177268 | 11/2015 | |
| WO | 2016/103824 | 6/2016 | |
| WO | 2018/110575 A1 | 6/2018 | |
| WO | WO-2018162297 A1 * | 9/2018 | ............ G01N 21/31 |

OTHER PUBLICATIONS

Takumi, Karasawa, Kohei Watanabe, Qishen Ha, Antonio Tejero-De-Pablos, Yoshitaka Ushiku, and Tatsuya Harada. "Multispectral object detection for autonomous vehicles." In Proceedings of the on Thematic Workshops of ACM Multimedia 2017, pp. 35-43. 2017. (Year: 2017).*

Choi, Sungil, Seungryong Kim, Kihong Park, and Kwanghoon Sohn. "Multi-spectral Vehicle Detection based on Convolutional Neural Network." Journal of Korea Multimedia Society 19, No. 12 (2016): 1909-1918. (Year: 2016).*

International Search Report of PCT application No. PCT/JP2019/037200 dated Dec. 17, 2019.

The Extended European Search Report dated Nov. 10, 2021 for the related European Patent Application No. 19873555.7.

* cited by examiner

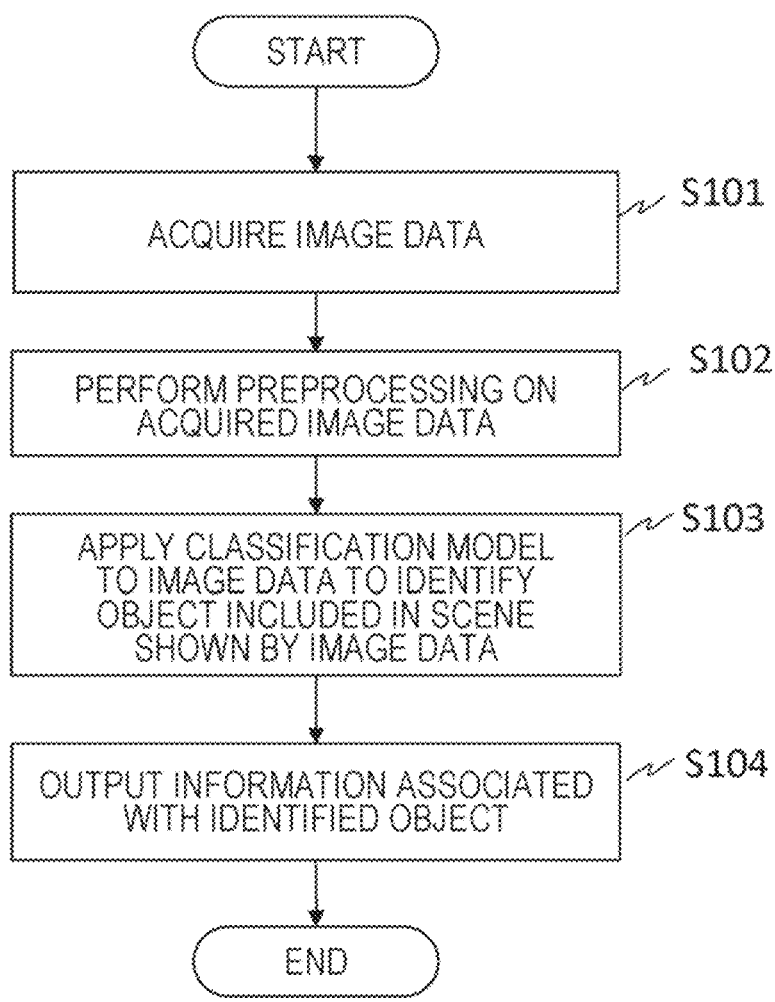

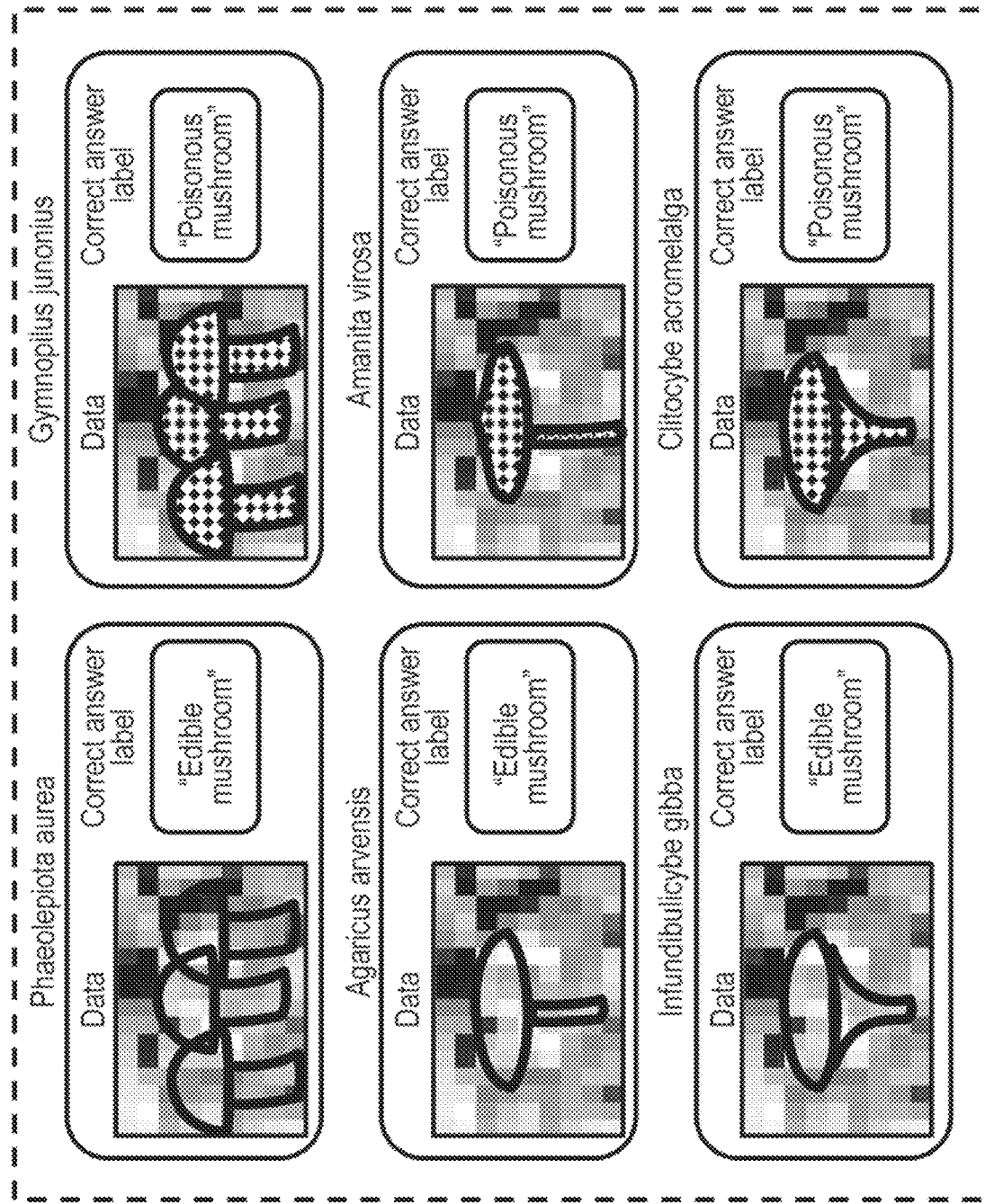

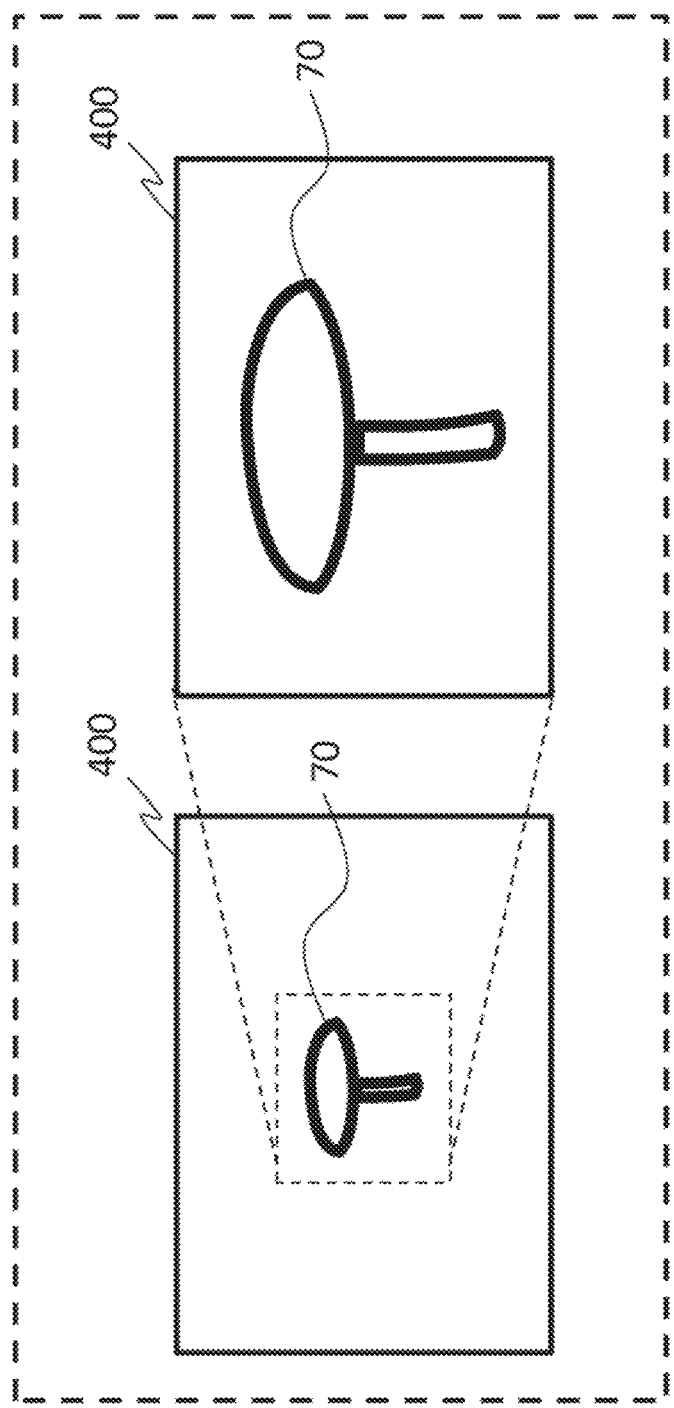

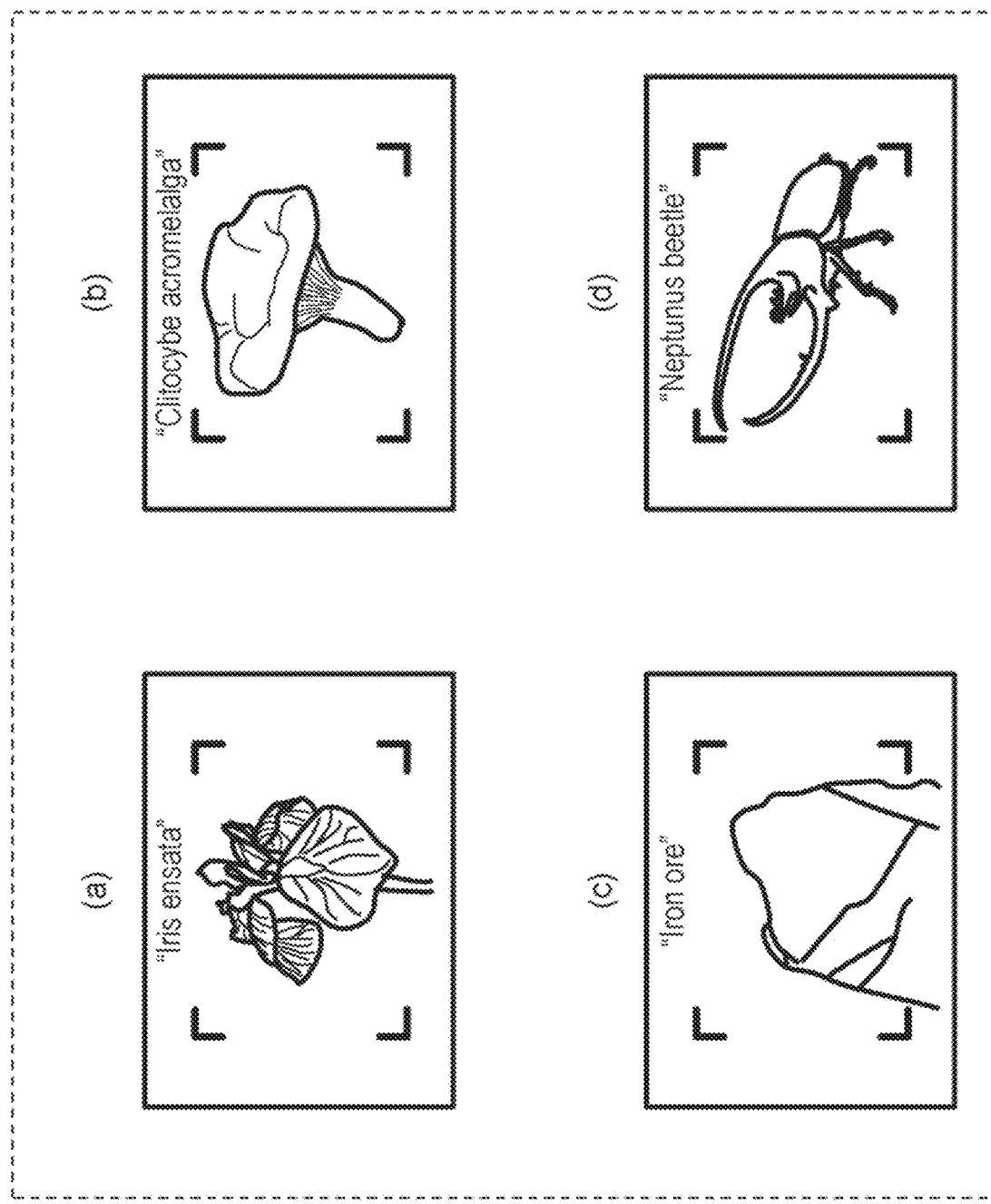

OBJECT CLASSIFICATION METHOD, VEHICLE CONTROL METHOD, INFORMATION DISPLAY METHOD, AND OBJECT CLASSIFICATION DEVICE

BACKGROUND

1. Technical Field

The present disclosure relates to an object classification method, a vehicle control method, an information display method, and an object classification device.

2. Description of the Related Art

In object recognition using machine learning, monochrome images or RGB images are generally utilized as learning data. Meanwhile, an attempt to perform object recognition utilizing a multispectral image including information of larger number of wavelengths than those in an RGB image has also been studied.

Japanese Unexamined Patent Application Publication (Translation of PCT Application) No. 2015-501432 discloses, as a sensor for acquiring a multispectral image, a spectrum camera in which filters that transmit light in different wavelength ranges are spatially arranged in a mosaic pattern. In order to enhance the recognition accuracy of immune cells in images, International Publication No. 2015/177268 discloses a method for learning the images of the immune cells with respect to a plurality of image channels by using a convolutional neural network. U.S. Patent Application Publication No. 2017/0076438 discloses a method for machine-learning in which a multispectral image or a hyperspectral image is used as training data.

SUMMARY

In one general aspect, the techniques disclosed here feature an object classification method including: acquiring image data of an image including feature information indicating a feature of an object; and classifying the object included in the image, based on the feature information. The image data is acquired by causing a first image capture device to capture the image. The first image capture device includes: an image sensor; and a filter array that is arranged on an optical path of light that is incident on the image sensor and that includes translucent filters two-dimensionally arrayed along a plane that crosses the optical path. The translucent filters includes two or more filters in which wavelength dependencies of light transmittances are different from each other. The light transmittance of each of the two or more filters has local maximum values in a plurality of wavelength ranges.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4A is a flowchart showing an example of an object recognition method using the object recognition device in the exemplary embodiment;

FIG. 4C is a diagram schematically showing an example of training datasets in the exemplary embodiment;

FIG. 5B is a diagram schematically showing object enlargement performed by an optical system having a zoom function;

FIG. 6A is a view schematically showing an example of application of the object recognition device in the exemplary embodiment;

DETAILED DESCRIPTION

Figure 1:
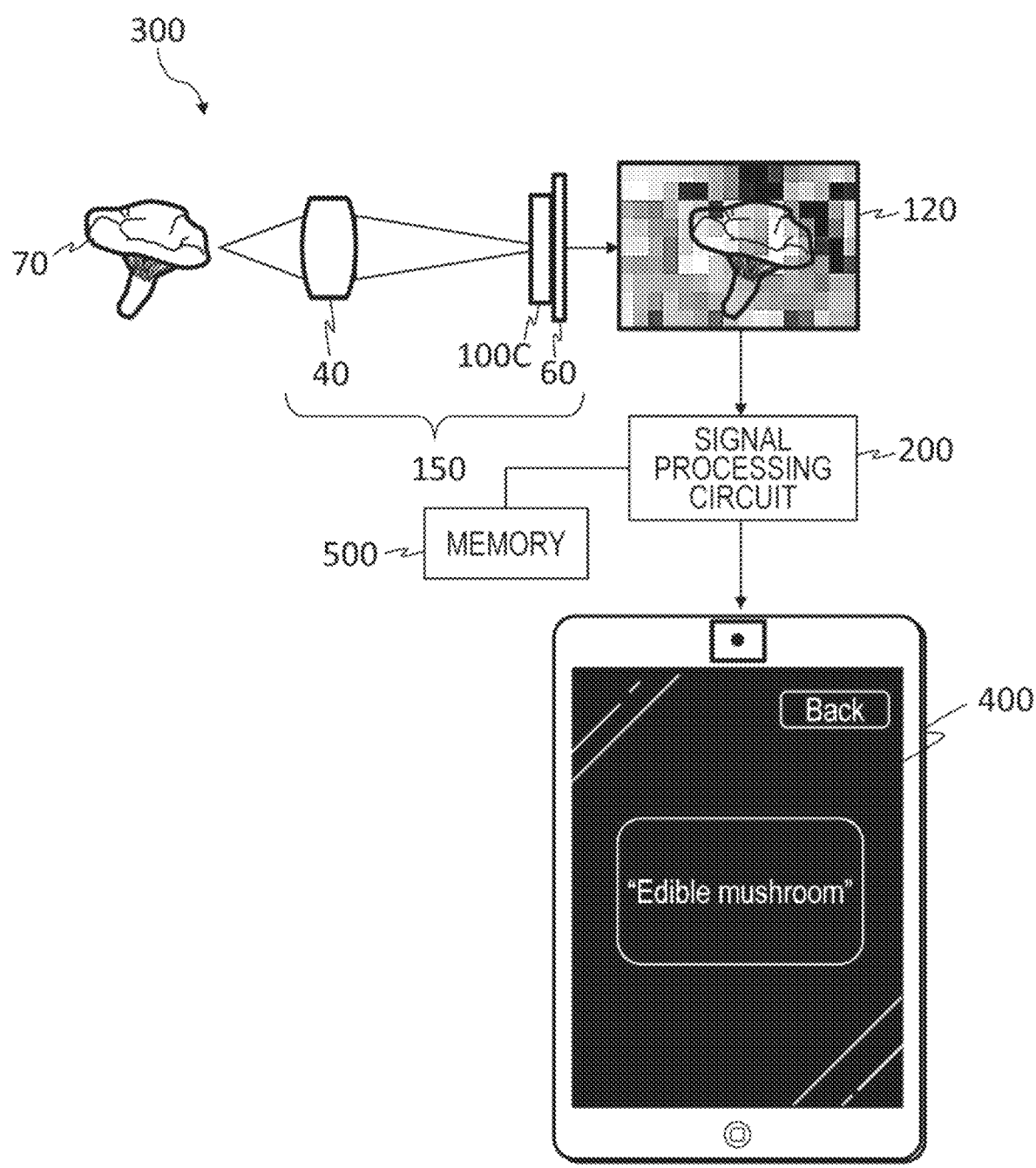
FIG. 1 is a view schematically showing an example of an object recognition device in an exemplary embodiment of the present disclosure.

Before embodiments of the present disclosure are described, a description will be given of findings underlying the present disclosure.

In object recognition using conventional RGB images, the recognition ability is limited. For example, there are cases in which a real thing and its signboard or poster cannot be distinguished therebetween. This is generally because the difference between the amount of components of R, G, and B of light reflected by the real thing and the amount of components of R, G, and B of light reflected by the signboard or the poster is small. For example, use of multiple wavelength spectrum data is conceivable in order to distinguish between the real thing and the signboard or the poster.

This makes it possible to detect minute differences in spectrum data which are caused by a difference in the material of an object.

In hyperspectral cameras, for example, wavelength filters having different transmission wavelength bands may be two-dimensionally arranged, as disclosed in Japanese Unexamined Patent Application Publication (Translation of PCT Application) No. 2015-501432. When an image for one frame is acquired with a single shot, as in moving-image shooting, the number of wavelength ranges and the spatial resolution have a tradeoff relationship. That is, when a large number of filters having differ transmission wavelength bands are arranged in a spatially distributed manner in order to acquire a multiple-wavelength image, the spatial resolution of the image acquired for each wavelength range decreases. Accordingly, even when a hyperspectral image is utilized for object recognition with a view to improve the object recognition accuracy, there is a possibility that the recognition accuracy decreases in practice due to a low spatial resolution.

Increasing the number of pixels in an image sensor is conceivable to improve both the wavelength resolution and the resolution. In this case, a large amount of three-dimensional data obtained by adding multiple wavelength data to spatial two-dimensional data is used. When machine learning is applied to such large-size data, a large amount of time or resources is spent for preprocessing, learning, communication, and data storage.

Based on the above-described study, the present inventor has conceived an object classification method described in the following items.

[Item 1]

An object classification method according to a first item includes: acquiring image data of an image including feature information indicating a feature of an object; and classifying the object included in the image, based on the feature information. The image data is acquired by causing a first image capture device to capture the image. The first image capture device includes: an image sensor; and a filter array that is arranged on an optical path of light that is incident on the image sensor and that includes translucent filters two-dimensionally arrayed along a plane that crosses the optical path. The translucent filters includes two or more filters in which wavelength dependencies of light transmittances are different from each other, and the light transmittance of each of the two or more filters has local maximum values in a plurality of wavelength ranges.

[Item 2]

In the object classification method according to the first item, the classifying of the object may be performed by applying a classification model that performs learning with a machine-learning algorithm to the image data; and the classification model may perform learning with first training datasets, each of the first training datasets including image data for learning and label data for identifying the object included in an image for learning, the image being indicated by the image data for learning.

[Item 3]

In the object classification method according to the second item, pieces of image data for learning which are included in the first training datasets may include image data for learning which is generated by a second image capture device that is different from the first image capture device.

[Item 4]

In the object classification method according to the third item, the second image capture device may include a filter array having a characteristic that is equivalent to a characteristic of the filter array in the first image capture device.

[Item 5]

The object classification method according to one of the second to fourth items may further include: causing the classification model to perform further learning with a second training dataset including the image data and second label data for identifying the object, after the object is classified.

[Item 6]

In the object classification method according to one of the second to the fifth items, positions of the object in the images for learning, the images for learning being included in pieces of image data for learning which are included in the first training datasets, may be different from each other in the pieces of image data for learning.

[Item 7]

In the object classification method according to one of the second to the sixth items, the image data for learning may be acquired by capturing an image of the object in a state in which the object occupies a predetermined range or more in the image for learning.

[Item 8]

In the object classification method according to one of the first to the seventh items, the acquiring of the image data may be performed using an image capture device including a display; and the object classification method may further include displaying, on the display, an auxiliary representation for notifying a user of an area where the object is to be located or a range to be occupied by the object in the image, before the image data is acquired.

[Item 9]

In the object classification method according to one of the first to the eighth items, the translucent filters may be different from each other in the wavelength dependencies of the light transmittances; and the light transmittance of each of the translucent filters may have local maximum values in a plurality of wavelength ranges.

[Item 10]

A vehicle control method according to a tenth item is a vehicle control method using the object classification method according to one of the first to ninth items. The first image capture device is attached to a vehicle; and the vehicle control method includes controlling an operation of the vehicle, based on a result of the classification of the object.

[Item 11]

An information display method according to an 11th item is an information display method using the object classification method according to one of the first to ninth items and includes: acquiring, from a database, data indicating at least one selected from the group consisting of a name of the object and a description of the object, based on a result of the classifying of the object; and displaying, on a display, the at least one selected from the group consisting of the name of the object and the description of the object.

[Item 12]

An object classification method according to a 12th item includes: acquiring image data of an image including feature information indicating a feature of an object; and classifying the object included in the image, based on the feature information. The image data is acquired by causing a first image capture device, which includes an image sensor and a light source array including light sources that emits light in wavelength ranges that are different from each other, to repeat an operation for capturing the image a plurality of times in a state in which some of the light sources are made to perform light emission while changing a combination of light sources included in the some of the light sources.

[Item 13]

In the object classification method according to the 12th item, the classifying of the object may be performed by applying a classification model that performs learning with a machine-learning algorithm to the image data; and the classification model may perform learning with first training datasets, each of the first training datasets including image data for learning and label data for identifying the object included in an image for learning, the image for learning being indicated by the image data for learning.

[Item 14]

In the object classification method according to the 13th item, pieces of image data for learning which are included in the first training datasets may include image data for learning which is generated by a second image capture device that is different from the first image capture device.

[Item 15]

In the object classification method according to the 14th item, the second image capture device may include a light source array having a characteristic that is equivalent to a characteristic of the light source array in the first image capture device.

[Item 16]

The object classification method according to the 13th to 15th items may further include: causing the classification model to perform further learning with a second training dataset including the image data and second label data for identifying the object, after the object is classified.

[Item 17]

In the object classification method according to one of the 13th to 16th items, positions of the object in the images for learning, the images for learning being included in pieces of image data for learning which are included in the first training datasets, may be different from each other in the pieces of image data for learning.

[Item 18]

In the object classification method according to one of the 13th to 17th items, the image data for learning may be acquired by capturing an image of the object in a state in which the object occupies a predetermined range or more in the image for learning.

[Item 19]

In the object classification method according to one of the 12th to 18th items, the acquiring of the image data may be performed using an image capture device including a display; and the object classification method may further include displaying, on the display, an auxiliary representation for notifying a user of an area where the object is to be located or a range to be occupied by the object in the image, before the image data is acquired.

[Item 20]

A vehicle control method according to a 20th item is a vehicle control method using the object classification method according to one of the 12th to 19th items. The first image capture device may be attached to a vehicle, and the vehicle control method may include controlling an operation of the vehicle, based on a result of the classification of the object.

[Item 21]

An information display method according to a 21st item is an information display method using the object classification method according to one of the 12th to 19th items and includes: acquiring, from a database, data indicating at least one selected from the group consisting of a name of the object and a description of the object, based on a result of the classifying of the object; and displaying, on a display, the at least one selected from the group consisting of the name of the object and the description of the object.

[Item 22]

An object classification device according to a 22nd item includes: an image sensor that generates image data of an image including feature information indicating a feature of an object; a filter array that is arranged on an optical path of light that is incident on the image sensor and that includes translucent filters two-dimensionally arrayed along a plane that crosses the optical path, the translucent filters including two or more filters in which wavelength dependencies of light transmittances are different from each other, light transmittance of each of the two or more filters having local maximum values in a plurality of wavelength ranges; and a signal processing circuit that classifies the object included in the image, based on the feature information.

[Item 23]

An object classification device according to a 23rd item includes: an image sensor that generates image signals for an image including an object; a light source array including light sources that emit light in wavelength ranges that are different from each other; a control circuit that controls the image sensor and the light sources and that repeats an operation for causing the image sensor to perform image capture a plurality of times in a state in which some of the light sources are made to emit light while changing a combination of the light sources included in the some of the light sources; and a signal processing circuit that classifies the object included in the image, based on feature information indicating a feature of the object, the feature information being included in image data constructed from the image signals generated by the image sensor performing the image capture the plurality of times.

[Item 24]

An object classification device according to a 24th item includes a memory and a signal processing circuit. The signal processing circuit receives two-dimensional image data of an image including pixels, the two-dimensional image data being multispectral or hyperspectral image data obtained by multiplexing information of wavelength ranges to data of each of the pixels and encoding a luminance distribution of each of the pixels, and classifies an object included in a scene shown by the two-dimensional image data, based on feature information included in the two-dimensional image data.

[Item 25]

In the object classification device according to the 24th item, the feature information may be extracted from the two-dimensional image data without reconstructing individual images in the wavelength ranges based on the two-dimensional image data.

[Item 26]

The object classification device according to the 24th item may further include an image capture device that acquires the two-dimensional image data.

[Item 27]

In the object classification device according to the 26th item, the two-dimensional image data may be acquired by capturing an image of the object in a state in which the object occupies a predetermined range or more in an image capture area of the image capture device.

[Item 28]

The object classification device according to the 27th item may further include a display that displays an auxiliary representation for notifying a user of an area where the object is to be located or a range to be occupied by the object in an image to be captured by the image capture device, before the image capture device acquires the two-dimensional image data.

[Item 29]

In the object classification device according to the 26th item, the image capture device may include: an image sensor; and a filter array that is arranged on an optical path of light that is incident on the image sensor and that includes translucent filters two-dimensionally arrayed along a plane that crosses the optical path, the translucent filters including two or more filters in which wavelength dependencies of light transmittances are different from each other, light transmittance of each of the two or more filters having local maximum values in a plurality of wavelength ranges.

[Item 30]

In the object classification device according to the 29th item, the translucent filters may include subsets that are cyclically arranged.

The embodiments described below each represent a general or specific example. Numerical values, shapes, materials, constituent elements, the arrangement positions of constituent elements, and so on described in the embodiments below are examples and are not intended to limit the present disclosure. Also, of the constituent elements in the embodiments described below, the constituent elements not set forth in the independent claims that represent the broadest concept will be described as optional constituent elements.

In the present disclosure, all or a part of circuits, units, devices, members, or portions or all or a part of functional blocks in the block diagrams can be implemented by one or more electronic circuits including a semiconductor device, a semiconductor integrated circuit (IC), or a large-scale integration (LSI. The LSI or IC may be integrated into one chip or also may be constituted by combining a plurality of chips. For example, functional blocks other than a storage element may be integrated into one chip. Although the name used here is an LSI or IC, it may also be called a system LSI, a very large scale integration (VLSI), or an ultra large scale integration (ULSI) depending on the degree of integration. A field programmable gate array (FPGA) that can be programmed after manufacturing an LSI or a reconfigurable logic device that allows reconfiguration of the connection relationship or setup of circuit cells inside the LSI can also be used for the same purpose.

In addition, functions or operations of all or a part of circuits, units, devices, members, or portions can be executed by software processing. In this case, the software is recorded on one or more non-transitory recording media, such as a read-only memory (ROM), an optical disk, or a hard disk drive, and when the software is executed by a processing device (a processor), the processing device (the processor) and peripheral devices execute the functions specified by the software. A system or a device may include one or more non-transitory recording media on which the software is recorded, a processing device (a processor), and necessary hardware devices, for example, an interface.

Embodiments of the present disclosure will be described below with reference to the accompanying drawings.

First Embodiment

FIG. 1 is a view schematically showing an example of an object recognition device 300 in an exemplary first embodiment of the present disclosure. FIG. 1 shows a situation in which a mushroom is photographed as one example. An object 70 to be photographed may be anything. The object recognition device 300 in the first embodiment includes an image capture device 150, a signal processing circuit 200, a display 400, and a memory 500. The image capture device 150 includes an optical system 40, a filter array 100C, and an image sensor 60. The object recognition device 300 can be, for example, a smartphone or a computer, such as a tablet computer. Cameras incorporated into those computers may function as the image capture device 150.

The filter array 100C is arranged on an optical path of light that is incident on the image sensor 60. In the present embodiment, the filter array 100C is arranged at a position that faces the image sensor 60. The filter array 100C may be arranged at another position. An optical image from the object 70 is encoded by the filter array 100C. The "encoding" herein means modulating an image by attenuating light that is incident on the filter array 100C with an attenuation rate that depends on the wavelength and the position of the light. Image data generated based on the image modulated in such a manner is referred to as "encoded image data". The configuration of the filter array 100C and details of the encoding are described below.

The image sensor 60 can be a monochrome-type image capture element having light-detecting cells, which are pixels two-dimensionally arrayed in an image capture plane. The image sensor 60 can be, for example, a charge-coupled device (CCD) sensor, a complementary metal-oxide semiconductor (CMOS) sensor, an infrared array sensor, a terahertz array sensor, or a millimeter-wave array sensor. The light-detecting cells include, for example, photodiodes. The image sensor 60 does not necessarily have to be a monochrome-type image capture element. For example, the image sensor 60 may employ a color-type image capture element having R/G/B, R/G/B/IR, or R/G/B/W filters. The image sensor 60 may have detection sensitivity not only in the visible wavelength range but also in the wavelength range of an X-ray, ultraviolet, near-infrared, mid-infrared, far-infrared, or a microwave or radio wave.

The image sensor 60 is arranged on an optical path of light that passed through the filter array 100C. In response to light that passed through the filter array 100C, the image sensor 60 generates image signals. Each light-detecting cell in the image sensor 60 outputs a photoelectric conversion signal corresponding to the amount of received light. Image signals are generated using the photoelectric conversion signals output from the light-detecting cells. FIG. 1 schematically shows an example of a captured image 120 constructed by the image signals, that is, the encoded image data.

The optical system 40 includes at least one lens. Although the optical system 40 is depicted as a single lens in the example shown FIG. 1, it may be constituted by a combination of a plurality of lenses. The optical system 40 may have a zoom function, as described below. The optical system 40 causes an optical image from the object 70 to be formed on the filter array 100C.

The signal processing circuit 200 is a circuit for processing the image signals output from the image sensor 60. The signal processing circuit 200 can be realized by, for example, a combination of a central processing unit (CPU), a graphics processing unit (GPU), and a computer program. Such a computer program is stored in, for example, a recording medium, such as a memory, and a processor, such as a CPU or a GPU, executes the program to thereby make it possible to execute recognition processing described below. The signal processing circuit 200 may be a digital signal processor (DSP) or a programmable logic device (PLD), such as a field programmable gate array (FPGA). A server computer connected to equipment, such as the image capture device 150 or a smartphone, through a network, such as the Internet may have the signal processing circuit 200.

The signal processing circuit 200 recognizes the object 70 by using the encoded image data. For example, a model that has performed learning with a known machine-learning algorithm can be used for the recognition of the object 70. Details of the object recognition method are described later.

The display 400 displays information associated with the recognized object 70. The display 400 can be, for example, a display of a smartphone or a tablet computer. The display 400 may be a display connected to a personal computer or the like or a display built into a laptop computer.

Next, a description will be given of the configuration of the filter array 100C and details of the encoding.

Figure 2A:
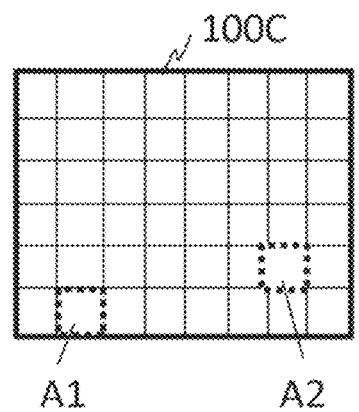
FIG. 2A is a diagram schematically showing an example of a filter array.

FIG. 2A is a diagram schematically showing an example of the filter array 100C. The filter array 100C has areas that are two-dimensionally arrayed. Herein, the areas may be referred to as "cells". Filters having spectral transmittances that are individually set are arranged in the respective areas. The "spectral transmittances" herein refer to light transmittances having wavelength dependency. The spectral transmittances are represented by a function $T(\lambda)$, where $\lambda$ is the wavelength of incident light. The spectral transmittances $T(\lambda)$ can take values that are larger than or equal to 0 and that are smaller than or equal to 1. As described above, the filter array 100C includes the filters that are two-dimensionally arrayed along a plane that crosses the optical path.

In the example shown in FIG. 2A, the filter array 100C has 48 rectangular areas arrayed in six rows by eight columns. A larger number of areas than that number can be provided in actual applications. The number can be approximately the same as, for example, the number of pixels in a typical image capture element, such as an image sensor. The number of pixels is, for example, a few hundred thousand to tens of millions. In one example, the filter array 100C is arranged directly above the image capture element, and each area can be arranged so as to correspond to one pixel in the image capture element. Each area faces, for example, one or more pixels in the image capture element.

Figure 2B:
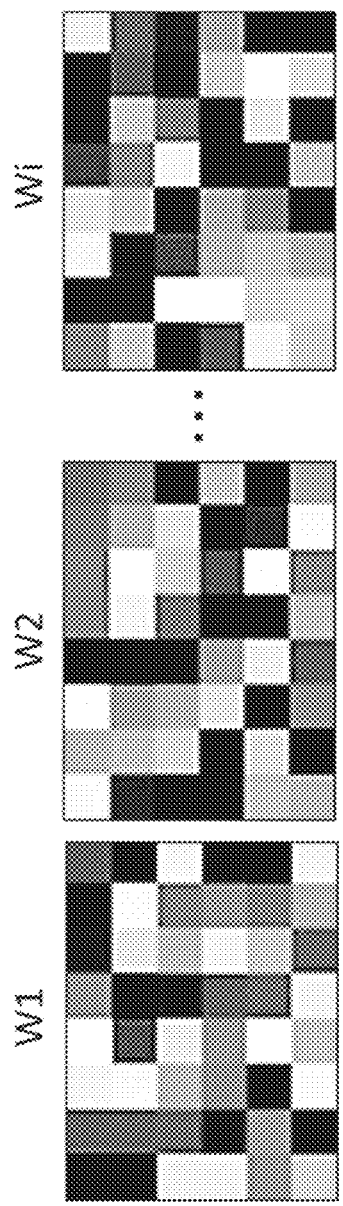
FIG. 2B is a view showing one example of spatial distributions of transmittances of light in wavelength ranges included in a target wavelength range.

FIG. 2B is a view showing one example of spatial distributions of transmittances of light in respective wavelength ranges W1, W2, . . . , and Wi included in a target wavelength range. In the example shown in FIG. 28, differences in darkness/brightness in the areas represent differences in the transmittances. The brighter the area is, the higher the transmittance is, and the darker the area is, the lower the transmittance is. As shown in FIG. 2B, the spatial distribution of the light transmittance differs depending on the wavelength range.

Figure 2C:
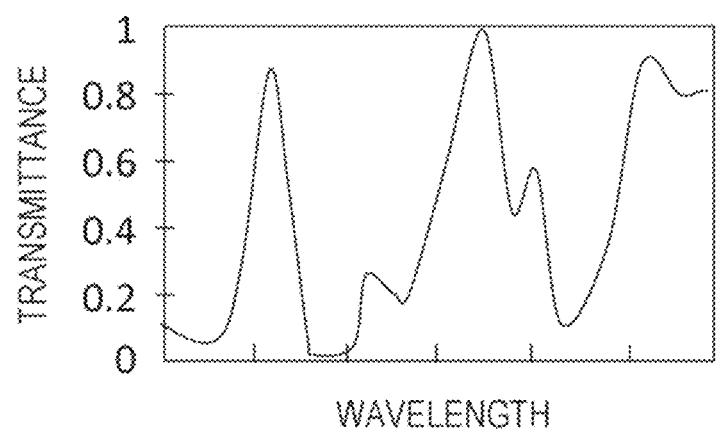
FIG. 2C is a graph showing an example of a spectral transmittance in one area in the filter array shown in FIG. 2A.
Figure 2D:
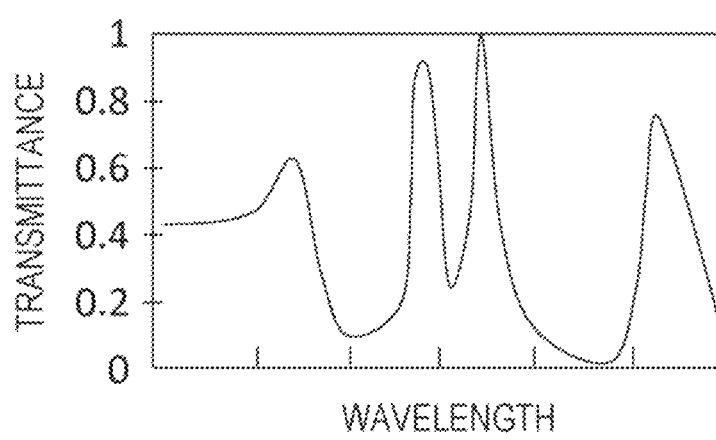
FIG. 2D is a graph showing an example of a spectral transmittance in another area in the filter array shown in FIG. 2A.

FIG. 2C and FIG. 2D are graphs showing examples of spectral transmittances in area A1 and area A2, respectively, included in the areas in the filter array 100C shown in FIG. 2A. The spectral transmittance in area A1 and the spectral transmittance in area A2 are different from each other. In this manner, the spectral transmittance in the filter array 100C differs depending on the area. However, the spectral transmittances in all the areas do not necessarily have to be different from each other. The spectral transmittances in at least two areas of the areas in the filter array 100C are different from each other. That is, the filter array 100C includes two or more filters in which spectral transmittances are different from each other. The spectral transmittance in each of the two or more filters has local maximum values in two or more wavelength ranges and has local minimum values in other two or more wavelength ranges.

Now, a description will be given of the meanings of the "local maximum values" and the "local minimum values" in the present disclosure. A value that exceeds 0.5 and whose difference with an adjacent local minimum value is larger than or equal to 0.2 when normalization is performed so that the maximum value of the spectral transmittance of a filter of interest becomes 1 and the minimum value thereof becomes 0 is defined as the "local maximum value" in the present disclosure. Similarly, when the above-described normalization is performed, a value that is smaller than 0.5 and whose difference with an adjacent local maximum value is larger than or equal to 0.2 is defined as the "local minimum value" in the present disclosure. All the spectral transmittances in the filters in the filter array 100C may be different from each other. In this case, the spectral transmittance of each filter can have the local maximum values in two or more wavelength ranges and can have the local minimum values in other two or more wavelength ranges. In one example, the number of patterns of the spectral transmittances in the filters included in the filter array 100C can be the same as the number i of wavelength ranges included in a target wavelength range. Typically, the filter array 100C can be designed so that the spectral transmittances of more than half of the filters are different.

The filter array 100C modulates, for each area, incident light into light having a plurality of discrete intensity peaks with respect to the wavelength, superimposes the light having multiple wavelengths, and outputs the light. As a result, the optical image that passes through the filter array 100C is encoded.

The wavelength-direction resolution of the spectral transmittance in each area can be generally set to the bandwidth of a desired wavelength range. In other words, of a wavelength range including one local maximum value in a curve line of the spectral transmittance, the width of a range that takes values that are larger than or equal to the average value of the local maximum value and a local minimum value that is the most adjacent to the local maximum value can be generally set to the bandwidth of a desired wavelength range. In this case, when the spectral transmittance is resolved into frequency components, for example, by a Fourier transform, the values of frequency components corresponding to the wavelength range increase relatively.

The filter array 100C is, typically, divided into cells corresponding to the areas sectioned into a lattice form, as shown in FIG. 2A. These cells have spectral transmittances that are different from each other. The wavelength distribution and the spatial distribution of the light transmittances in the areas in the filter array 100C can be, for example, random distributions or pseudo-random distributions.

The concepts of the random distribution and the pseudo-random distribution are as follows. First, the areas in the filter array 100C can be regarded as, for example, vector elements having values of 0 to 1 according to the light transmittances. In this case, when the transmittance is 0, the value of the vector element is 0, and when the transmittance is 1, the value of the vector element is 1. In other words, a collection of areas that are arranged in one line in a row direction or a column direction can be regarded as a multi-dimensional vector having values of 0 to 1. Accordingly, the filter array 100C can be said to include a plurality of multidimensional vectors in the column direction or the row direction. In this case, the random distribution means that arbitrary two multidimensional vectors are independent from each other, that is, are not parallel to each other. Also, the pseudo-random distribution means that an unindependent configuration is included between some multidimensional vectors. Accordingly, in the random distribution and the pseudo-random distribution, a vector whose elements are values of the transmittances of light in a first wavelength range in areas belonging to a collection of the areas arranged in one row or column included in a plurality of areas and a vector whose elements are values of the transmittances of light in the first wavelength range in areas belonging to a collection of the areas arranged in another row or column are independent from each other. In a second wavelength range that is different from the first wavelength range, similarly, a vector whose elements are values of the transmittances of light in a second wavelength range in areas belonging to a collection of the areas arranged in one row or column included in a plurality of areas and a vector whose elements are values of the transmittances of light in the second wavelength range in areas belonging to a collection of the areas arranged in another row or column are independent from each other.

When the filter array 1000 is arranged adjacent to or directly above the image sensor 60, a cell pitch, which is the interval between the areas in the filter array 100C, may be made to generally match the pixel pitch of the image sensor 60. With this arrangement, the resolution of an encoded optical image emitted from the filter array 100C generally matches the resolution of the pixels. When the filter array 100C is arranged away from the image sensor 60, the cell pitch may be reduced according to the distance therebetween.

In the example shown in FIGS. 2A to 2D, the transmittance distribution is assumed to be a grayscale transmittance distribution in which the transmittance of each area can take a value that is larger than or equal to 0 and that is smaller than or equal to 1. However, the transmittance distribution does not necessarily have to be made to be a grayscale transmittance distribution. For example, a binary-scale transmittance distribution in which the transmittance of each area can take a value of either generally 0 or generally 1 may be employed. In the binary-scale transmittance distribution, each area transmits a majority of light in at least two wavelength ranges of wavelength ranges included in a target wavelength range and does not transmit a majority of light in the remaining wavelength ranges. The "majority" herein refers to generally 80% or more.

Some of all the cells, for example, half of the cells may be replaced with transparent areas. Such transparent areas transmit light in all the wavelength ranges W1 to Wi included in the target wavelength range at approximately the same high transmittance. The high transmittance is, for example, larger than or equal to 0.8. In such a configuration, the transparent areas can be arranged, for example, in a checkered pattern. That is, in two array directions of two or more areas in the filter array 100C, the areas in which the light transmittance differs depending on the wavelength and the transparent areas can be alternately arrayed. In the example shown in FIG. 2A, the two array directions are a horizontal direction and a vertical direction. Extracting components that are transmitted through the transparent areas arranged in the checkered pattern allows one camera to acquire monochrome images at the same time.

The filter array 100C can be constituted by at least one selected from a group consisting of a multilayer film, an organic material, a diffraction grating structure, and a microstructure including metal. In the case of the multilayer film, for example, a multilayer film including a dielectric multilayer film or a metal film is used. In this case, at least one of the thickness, material, and the stacking order of the multilayer film can be designed so as to be different in each cell. This makes it possible to realize different spectral characteristics in each cell. Also, the multilayer film makes it possible to realize spectral characteristics having sharp rising or falling. When the organic material is used, using a different colorant or dye or stacking different types of material makes it possible to realize different spectral characteristics in each cell. In the case of the diffraction grating structure, provision of a diffraction structure having a different diffraction pitch or depth makes it possible to realize different spectral characteristics in each cell. In the case of the microstructure including metal, spectral diffraction due to a plasmon effect makes it possible to realize different spectral characteristics.

The filter array 100C is arranged adjacent to or directly above the image sensor 60. The "adjacent to" herein means being in close proximity to a degree that an optical image from the optical system 40 is formed on a plane of the filter array 100C at a certain level of clearness. The "immediately above" means that both are in close proximity to each other to a degree that almost no gap occurs therebetween. The filter array 100C and the image sensor 60 may be integrated together. The filter array 100C is a mask having a spatial distribution of light transmittances. The filter array 100C modulates the intensity of incident light and transmits the light.

Figure 3A:
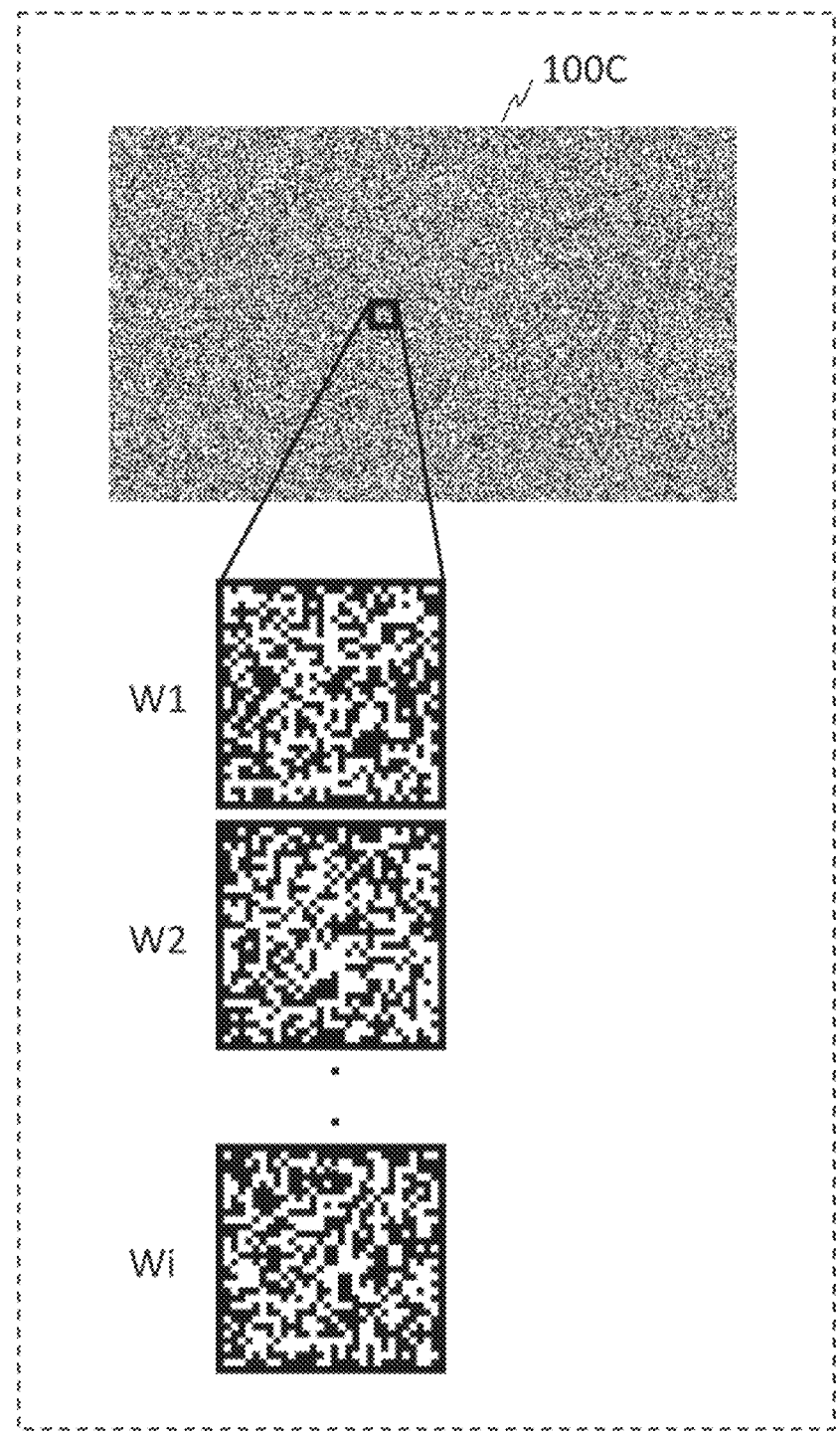
FIG. 3A is a view schematically showing an example of two-dimensional distributions of the filter array.
Figure 3B:
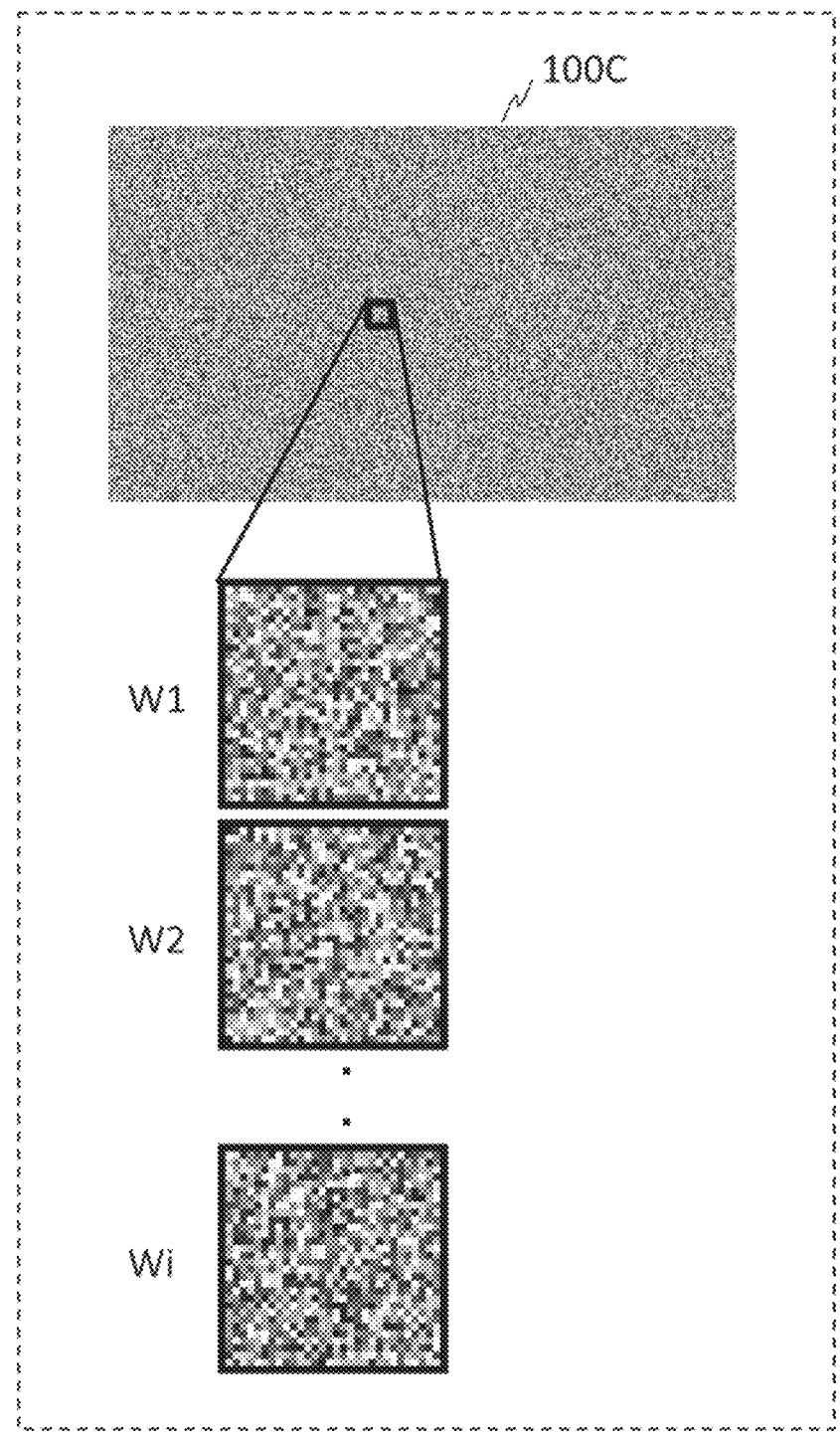
FIG. 3B is a view schematically showing another example of the two-dimensional distributions of the filter array.

FIGS. 3A and 3B are views schematically showing examples of a two-dimensional distribution of the filter array 100C.

As shown in FIG. 3A, the filter array 100C may be constituted by a binary mask. Black portions indicate light shielding, and white portions indicate light transmission. Light that passes through the white portions are transmitted 100%, and light that passes through the black portions are shielded 100%. The two-dimensional distribution of the transmittances of the mask can be a random distribution or a pseudo-random distribution. The two-dimensional distribution of the transmittances of the mask does not necessarily have to be a completely random. This is because the encoding by the filter array 100C is performed in order to distinguish images for respective wavelengths. The ratio of the black portions to the white portion does not have to be 1 to 1. For example, the white portions to the black portions may be 1 to 9. As shown in FIG. 3B, the filter array 100C may be a mask having a grayscale transmittance distribution.

As shown in FIGS. 3A and 3B, the filter array 100C has spatial distributions of transmittances that differ for the respective wavelength ranges W1, W2, . . . , and Wi. The spatial distributions of transmittances for the respective wavelength ranges do not match even when they are translated in parallel.

The image sensor 60 can have a monochrome-type image capture element having two-dimensional pixels. However, the image sensor 60 does not necessarily have to be constituted by a monochrome-type image capture element. For example, a color-type image capture element having filters for R/G/B, R/G/B/IR, or R/G/B/W may be used for the image sensor 60. The color-type image capture element makes it possible to increase the amount of information regarding wavelengths. This makes it possible to supplement characteristics of the filter array 100C and makes it easy to perform filter design.

Next, a description will be given of a process in which the object recognition device 300 in the present embodiment acquires image data showing a captured image 120. An optical image from the object 70 is formed by the optical system 40 and is encoded by the filter array 100C disposed immediately prior to the image sensor 60. As a result, images having pieces of encoded information that differ for the respective wavelength ranges overlap each other and are formed on the image sensor 60 as a multiplexed image. Thus, the captured image 120 is acquired. At this time, since a spectroscopic element, such as a prism, is not used, image spatial shift does not occur. This makes it possible to maintain a high spatial resolution even for a multiplexed image. As a result, it is possible to enhance the accuracy of the object recognition.

The wavelength ranges may be limited by placing a bandpass filter in a portion of the object recognition device 300. When the wavelength range of the object 70 is known to some extent, limiting the wavelength ranges also makes it possible to limit the identification range. As a result, it is possible to realize a high recognition accuracy of objects.

Next, a description will be given of an object recognition method using the object recognition device 300 in the present embodiment.

FIG. 4A is a flowchart showing an example of an object recognition method using the object recognition device 300 in the present embodiment. This object recognition method is executed by the signal processing circuit 200. The signal processing circuit 200 executes a computer program stored in the memory 500 to thereby execute processes in steps S101 to S104 shown in FIG. 4A.

First, a user performs image capture on an object 70 with the image capture device 150 included in the object recognition device 300. Thus, the encoded captured image 120 is obtained.

In step S101, the signal processing circuit 200 acquires image data generated by the image capture device 150. The image data shows the encoded captured image 120.

In step S102, the signal processing circuit 200 performs preprocessing on the acquired image data. The preprocessing is performed in order to enhance the recognition accuracy. The preprocessing can include, for example, processing, such as area extraction, smoothing processing for noise removal, and feature extraction. The preprocessing may be omitted if it is not necessary.

In step S103, the signal processing circuit 200 applies a classification model that has performed learning to the image data to identify the object 70 included in a scene shown by the preprocessed image data. The classification model has performed pre-learning through, for example, a known machine-learning algorithm. Details of the classification model are described later.

In step S104, the signal processing circuit 200 outputs information associated with the object 70. The signal processing circuit 200 outputs, for example, information, such as the name and/or detailed information of the object 70, to the display 400. The display 400 displays an image indicating the information. The information is not limited to an image and may be presented, for example, via sound.

Next, a description will be given of the classification model used in the object recognition method.

Figure 4B:
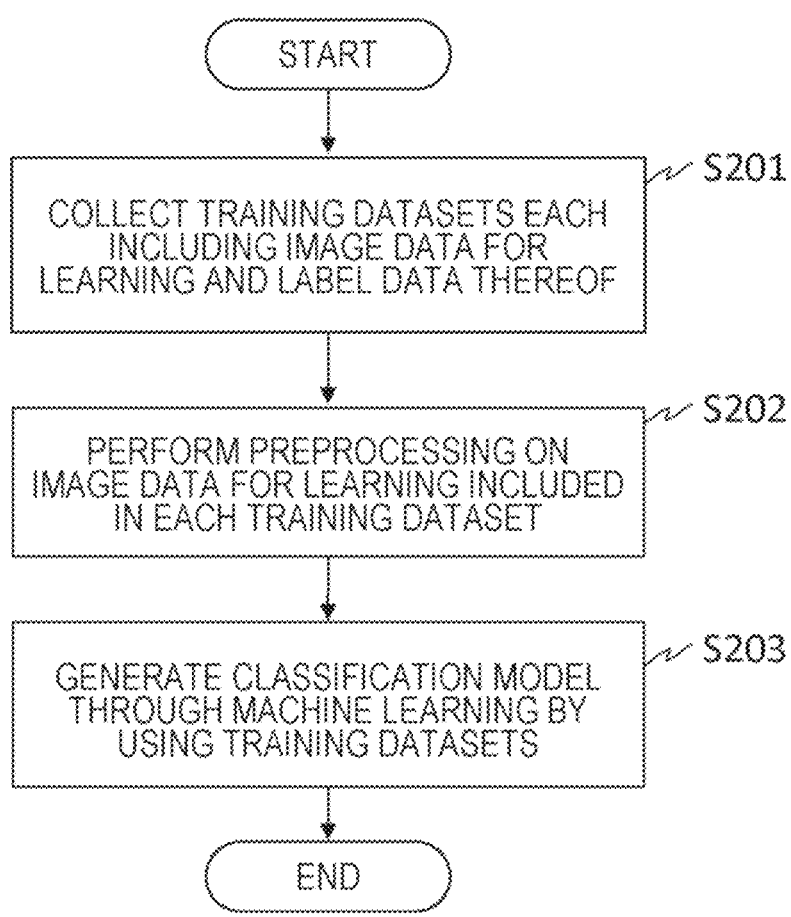
FIG. 4B is a flowchart showing an example of classification-model generation processing.

FIG. 4B is a flowchart showing an example of classification-model generation processing.

In step S201, the signal processing circuit 200 collects training datasets. Each of the training datasets includes image data for learning and label data. The label data is information for identifying the object 70 included in a scene shown by the image data for learning. The image data for learning is image data encoded by a method that is analogous to that for the above-described image data. Pieces of image data for learning which are included in the training datasets can include image data for learning which are generated by the image capture device 150 in the present embodiment or another image capture device. Details of the training datasets are described later.

In step S202, the signal processing circuit 200 performs preprocessing on the image data for learning which are included in the respective pieces of training datasets. The preprocessing is the same as that described above.

In step S203, by using the training datasets, the signal processing circuit 200 generates a classification model through machine learning. The machine learning can use, for example, an algorithm, such as deep learning, a support vector machine, a decision tree, genetic programming, a Bayesian network, or the like. When deep learning is used, for example, an algorithm for a convolutional neural network (CNN), a recurrent neural network (RNN), or the like can be used.

In the present embodiment, utilizing a model trained by machine learning allows information regarding an object in a scene to be directly acquired from the encoded image data. In order to perform similar processing in the related art, a large amount of computational operation is needed. For example, pieces of image data for the wavelength ranges need to be reconstructed from the encoded image data by using a method, such as compression sensing, and an object needs to be identified from those pieces of image data. In contrast, in the present embodiment, the image data for the wavelength ranges do not need to be reconstructed from the encoded image data. Accordingly, it is possible to save the time or calculation resources spent for processing for the reconstruction.

FIG. 4C is a diagram schematically showing an example of training datasets in the present embodiment. In the example shown in FIG. 4C, each training dataset includes encoded image data showing one or more mushrooms and label data indicating whether the mushroom is an edible mushroom or a poisonous mushroom. In such a manner, in each training dataset, the encoded image data and the label data indicating the correct answer label correspond to each other on a one-to-one basis. The correct answer label can be information indicating, for example, the name, characteristics, sensory evaluation, such as "tasty" or "not tasty", or a determination, such as "good" or "bad", of the object 70. In general, the accuracy of learning can be enhanced as the number of training datasets increases. In this case, the positions of the object 70 in images in the pieces of image data for learning which are included in the training datasets may be different depending on the image data for learning. The encoded information differs from one pixel to another. Accordingly, the accuracy of the object recognition using the classification model can be increased, as the number of pieces of image data for learning which show images in which the positions of the object 70 are different increases.

In the object recognition device 300 in the present embodiment, the classification model is incorporated into the signal processing circuit 200 before it is used by the user. In another method, the encoded image data indicating the captured image 120 may be transmitted to a classification system, which is separately prepared outside, through a network or a cloud. In the classification system, for example, it is possible to perform high-speed processing using a supercomputer. Thus, even when the processing speed of the user's terminal is low, a recognition result of the object 70 can be provided to the user at high speed, as long as the terminal can be connected to the network.

The image data acquired in step S101 in FIG. 4A and the image data for learning which is acquired in step S201 in FIG. 4B can be encoded, for example, by filter arrays having equivalent characteristics. In this case, it is possible to enhance the recognition accuracy of the object 70. Herein, the filter arrays having equivalent characteristics do not have to strictly have the same characteristics, and the light transmission characteristics may be different in some filters. For example, characteristics of filters of a few percent to several dozens of percent of all the filters may be different. When the image data for learning is generated using another image capture device, the other image capture device can include a filter array having characteristics that are equivalent to those of the filter array 100C included in the image capture device 150.

The recognition result of the object 70 may be fed back to the classification model. This makes it possible to further train the classification model.

Figure 4D:
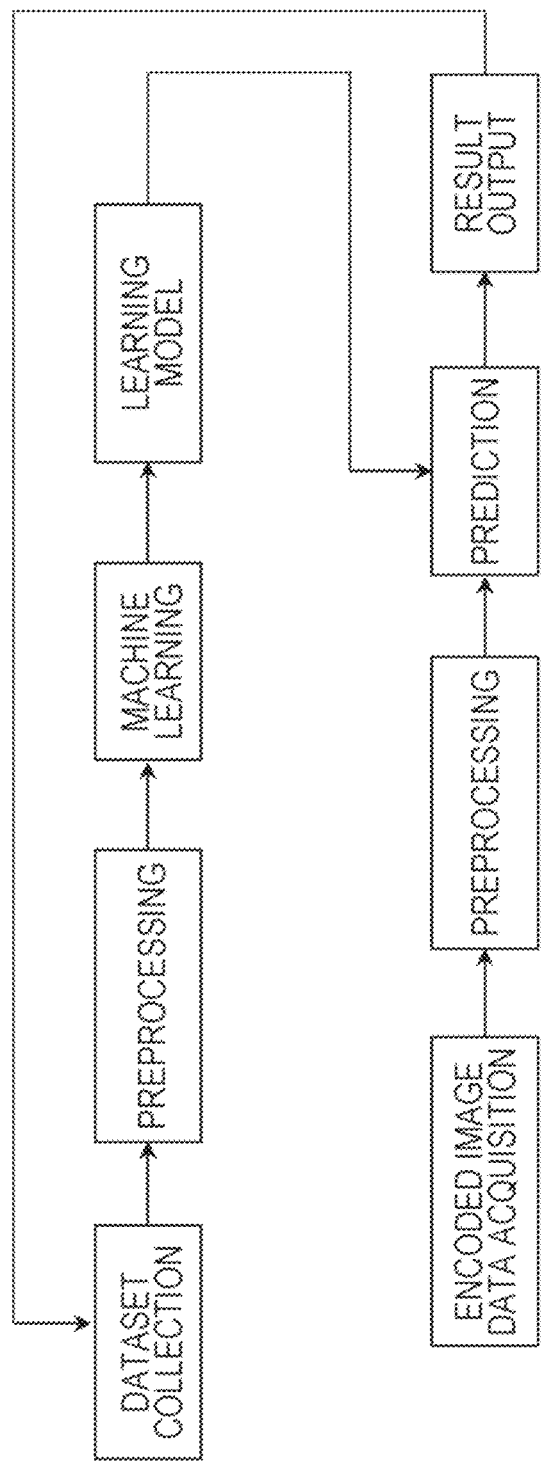
FIG. 4D is a diagram schematically showing an example in which a recognition result of an object is fed back to a classification model.

FIG. 4D is a diagram schematically showing an example in which the recognition result of the object 70 is fed back to the classification model. In the example shown in FIG. 4D, the classification model that has performed learning is applied to encoded image data that has been preprocessed, and a classification result is output. In response, the result is added to a dataset, and the dataset is used to further perform machine learning. This further trains the model, making it possible to improve the prediction accuracy.

Figure 4E:
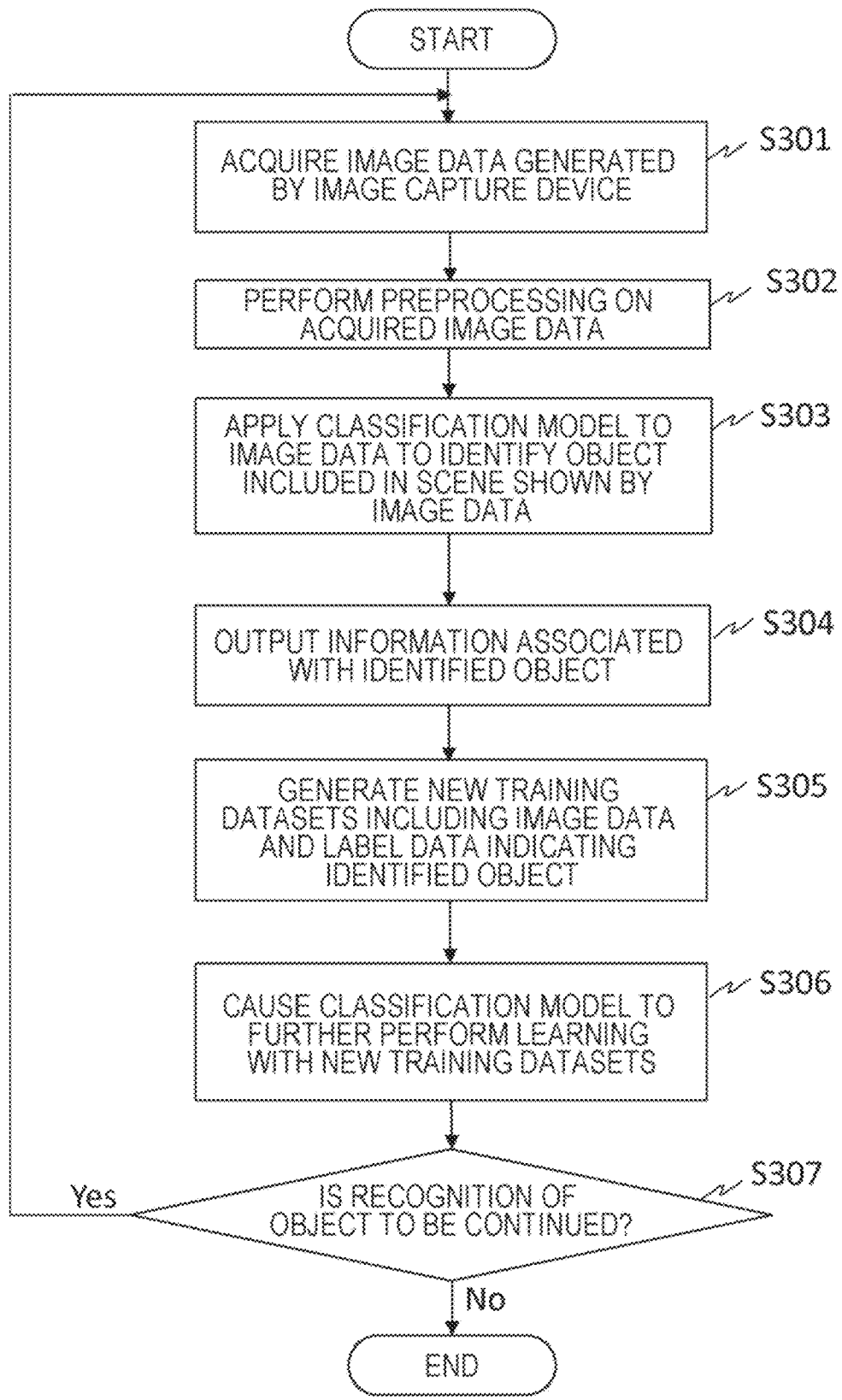
FIG. 4E is a flowchart showing another example of the object recognition method using the object recognition device in the exemplary embodiment.

FIG. 4E is a flowchart showing an operation in more detail when the recognition result is fed back to the classification model.

Steps S301 to S304 shown in FIG. 4E are respectively the same as steps S101 to S104 shown in FIG. 4A. Thereafter, steps S305 to S307 are executed.

In step S305, the signal processing circuit 200 generates new training datasets including the image data acquired in step S301 and label data indicating the object 70 recognized in step S303.

In step S306, the signal processing circuit 200 causes the classification model to further perform learning with the new training datasets. This learning processing is analogous to the learning processing shown in steps S202 and S203 shown in FIG. 4B.

In step S307, the signal processing circuit 200 determines whether or not the recognition of the object 70 is to be continued. When the determination indicates Yes, the signal processing circuit 200 executes the process in steps S301 again. When the determination indicates No, the signal processing circuit 200 finishes the recognition of the object 70.

The recognition result of the object 70 is fed back to the classification model, as described above, to thereby make it possible to improve the recognition accuracy of the classification model. In addition, the feedback also makes it possible to create a classification model that is suitable for the user.

When a classification system is separately provided, the user may transmit a dataset including the recognition result of the object 70 to the classification system through a network for feedback. The dataset can include data showing the captured image 120 generated by image-capture or data acquired by performing preprocessing on the data and label data indicating a correct answer label based on a recognition result using the classification model or the user's knowledge. An incentive, such as a reward or points, may be given from the provider of the classification system to the user who transmits the dataset for the feedback. Before the transmission, permission of access to the captured image 120 acquired by the user or authentication indicating whether or not automatic transmission is allowed may be, for example, displayed on the display 400 in the form of a screen popup.

The filter array 100C can multiplex not only apiece of wavelength information for one pixel but also a plurality of pieces of wavelength information for one pixel. The captured image 120 includes multiplexed two-dimensional information. The two-dimensional information is, for example, spectrum information that is randomly encoded with respect to space and wavelengths. When a fixed pattern is used for the filter array 100C, the pattern of encoding is learned by machine learning. Thus, virtually three-dimensional (i.e., position: two-dimensional, and wavelength: one-dimensional) information, though it is two-dimensional input data, is utilized for the object recognition.

Since the image data in the present embodiment is data in which wavelength information is multiplexed, the spatial resolution per wavelength can be enhanced compared with a conventional hyperspectral image with which the spatial resolution is sacrificed. In addition, the object recognition device 300 in the present embodiment can acquire image data for one frame with a single shot. This makes it possible to perform object recognition that handles a moving object or hand-shake well, compared with a conventional scan-system hyperspectral image capture system having high a resolution.

In capture of conventional hyperspectral images, there is a problem that the detection sensitivity per wavelength is low. For example, when the spectral transmittance is resolved into 40 wavelengths, the amount of light per pixel decreases to one fortieth, compared with a case in which the spectral transmittance is not resolved. In contrast, in the method in the present embodiment, the amount of light of, for example, about 50% of the amount of incident light is detected by the image sensor 60, as illustrated in FIGS. 3A and 3B. Thus, the amount of light that is detected per pixel becomes high compared with conventional hyperspectral images. As a result, the S/N ratio of the images increases.

Next, a description will be given of an example of another function of the image capture device in which the object recognition method in the present embodiment is implemented.

Figure 5A:
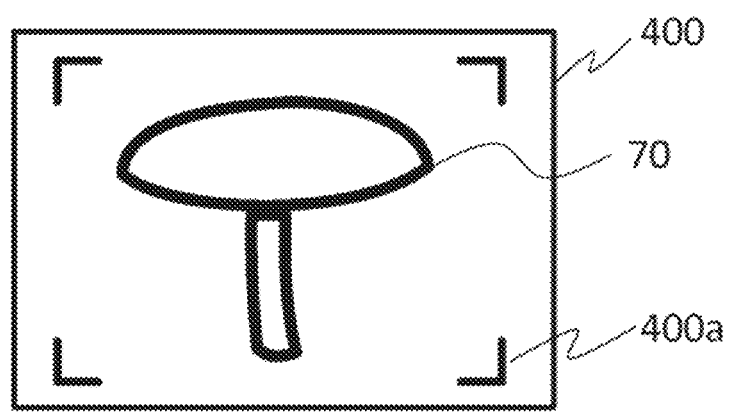
FIG. 5A is a view schematically showing a function for displaying a recommended area for object recognition to aid image capture.

FIG. 5A is a view schematically showing a function for displaying a recommended area for object recognition to aid image capture performed by a camera. When an image of an object 70 is formed on the image sensor 60 in an extremely small size or in an extremely large size, a difference occurs between the formed image of the object 70 and an image in a training dataset recognized at the time of learning, and the recognition accuracy decreases. In the filter array 100C, for example, pieces of wavelength information that are included in the pixels differ from each other. Thus, when the object 70 is detected by only a part of an image capture area of the image sensor 60, imbalance occurs in the wavelength information. In order to prevent imbalance in the wavelength information, the object 70 can be photographed in an area as large as possible in the image capture area of the image sensor 60. Also, when an image of the object 70 is captured while it protrudes from the image capture area of the image sensor 60, loss occurs in information on the spatial resolution of the object 70. Accordingly, the recommended area for the object recognition is slightly inside the image capture area of the image sensor 60. In the example shown in FIG. 5A, an auxiliary representation 400a indicating the recommended area for the object recognition is displayed on the display 400. In FIG. 5A, the entire area of the display 400 corresponds to the image capture area of the image sensor 60. For example, the area of 60% to 98% of the horizontal width or the vertical width of the image capture area can be displayed on the display 400 as the recommended area for the object recognition. The recommended area for the object recognition may be the area of 70% to 95% of the horizontal width or the vertical width of the image capture area or may be the area of 80% to 90% thereof. The auxiliary representation 400a may be displayed on the display 400, as described above, before the image capture device 150 acquires the image data. The auxiliary representation 400a notifies the user of an area where the object 70 is to be located or a range to be occupied by the object 70 in a scene to be image-captured. Similarly, each of the pieces of image data for learning which are included in the training datasets can be acquired by image-capturing the object 70 in a state in which the object 70 occupies a predetermined range or more in an image.

FIG. 5B is a diagram schematically showing a state in which the object 70 is enlarged by an optical system having a zoom function. In an example shown at the left portion in FIG. 5B, the object 70 before enlargement is displayed on the display 400, and in an example shown at the right portion in FIG. 5B, the object 70 after the enlargement is displayed on the display 400. Thus, the optical system 40 having the zoom function allows an image of the object 70 to be formed in a large area on the image sensor 60.

Figure 5C:
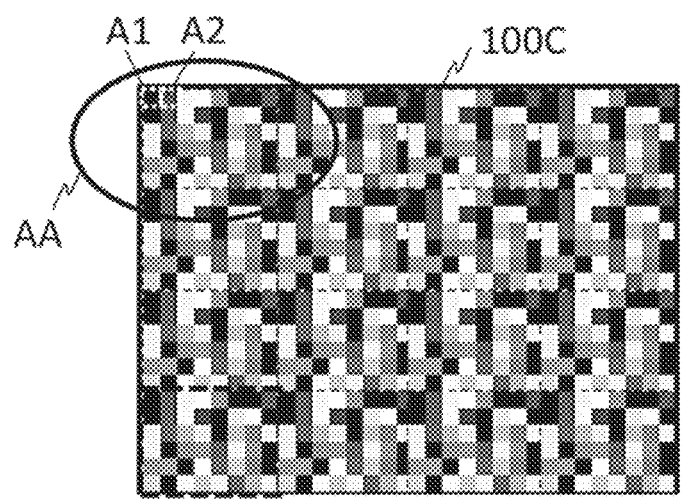
FIG. 5C is a view schematically showing a modification of the filter array.

FIG. 5C is a view schematically showing a modification of the filter array 100C. In an example shown in FIG. 5C, area groups AA, each consisting of a collection of areas (A1, A2, . . . ), are cyclically arranged. The areas have spectral characteristics that are different from each other. The "cyclically" means that the area group AA is vertically and/or horizontally repeated twice or more while maintaining the spectral characteristics. The filter array 100C shown in FIG. 5C can prevent spatial imbalance in the wavelength information. In addition, in learning of object recognition, the learning may be performed using only the area group AA, which is a subset of the cyclic structure, rather than using the entire filter array 100C shown in FIG. 5C. This makes it possible to realize a reduction in the learning time. Cyclically arranging a filter having the same spectral characteristics in space enables object recognition even when an object is image-captured in a part of the image capture area, not in the entire image capture area.

An image encoded by the filter array 100C can include, for example, randomly multiplexed wavelength information. Thus, it is difficult for the user to see the image. Accordingly, the object recognition device 300 may separately include an ordinal camera for display to the user. That is, the object recognition device 300 may include a binocular configuration having the image capture device 150 and an ordinary camera. This allows an un-encoded visible monochrome image to be displayed on the display 400 for the user. As a result, the user can easily recognize the positional relationship between the object 70 and the image capture area of the image sensor 60.

The object recognition device 300 may have a function for extracting the contour of the object 70 in the image. Extracting the contour makes it possible to remove unnecessary background around the object 70. Image data from which the unnecessary background is removed may be used as the image data for learning. In this case, it is possible to further enhance the recognition accuracy. The object recognition device 300 may have a function for displaying a recognition result of the contour on the display 400 to allow the user to finely adjust the contour.

Figure 6B:
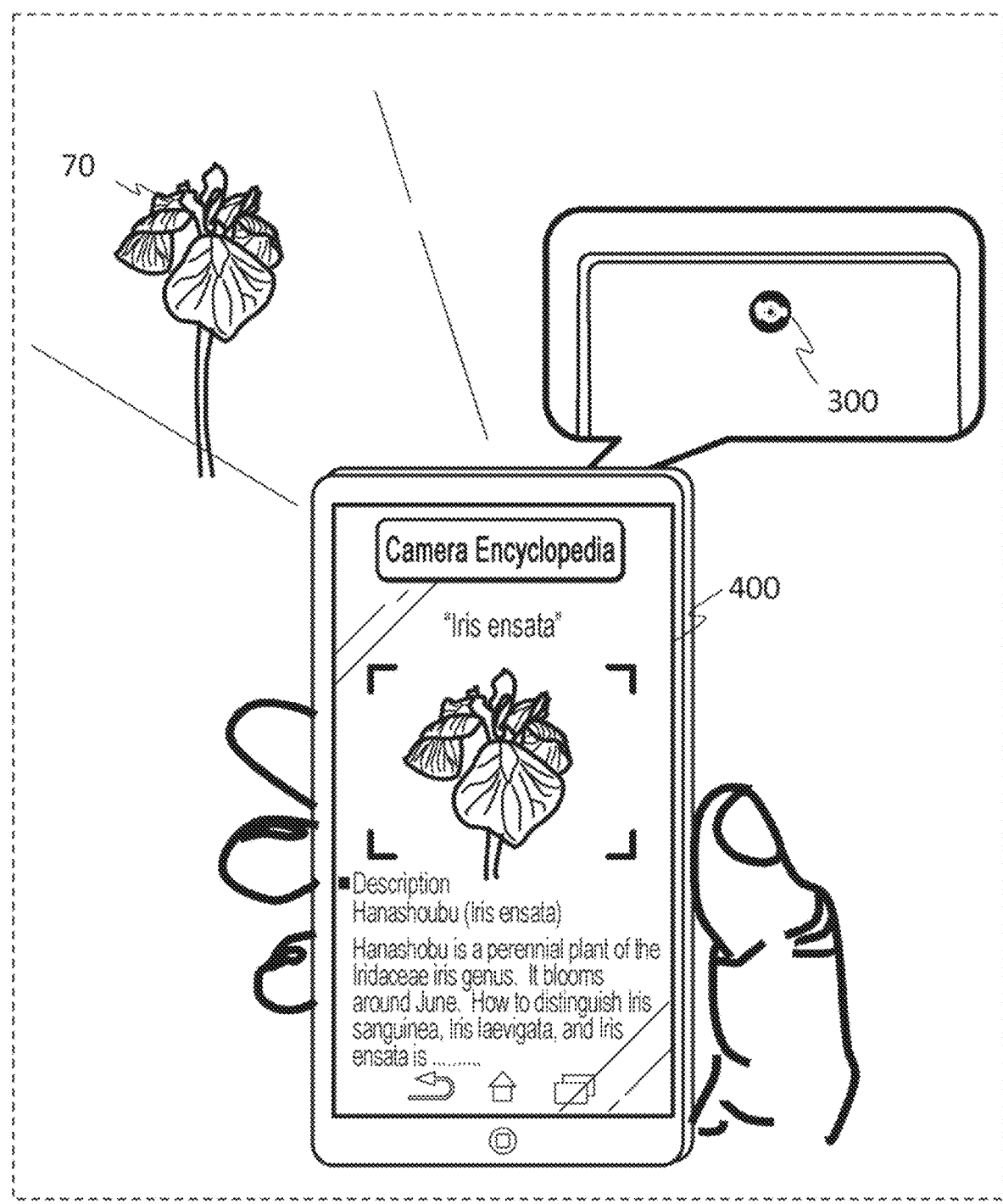
FIG. 6B is a view schematically showing another example of application of the object recognition device in the exemplary embodiment.
Figure 6C:
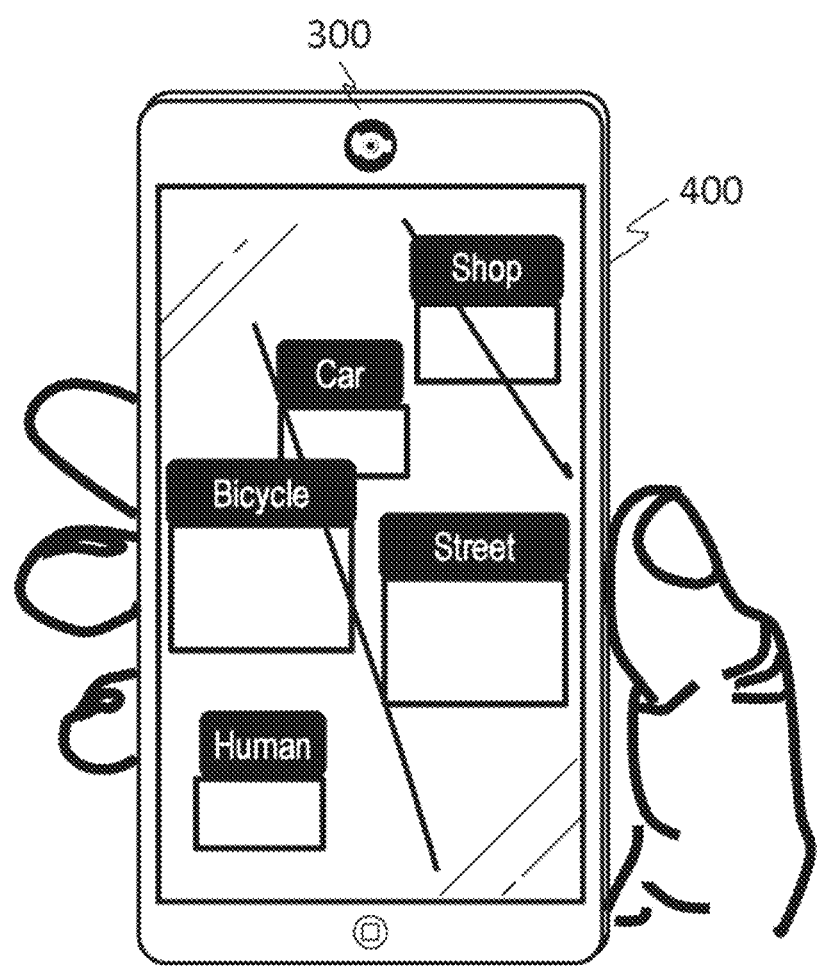
FIG. 6C is a view schematically showing another example of application of the object recognition device in the exemplary embodiment.

FIGS. 6A to 6C are views schematically showing an example of application of the object recognition device 300 in the present embodiment.

Part (a) in FIG. 6A shows an example of application to determination of a plant species. Part (b) in FIG. 6A shows an example of application to display of a food name. Part (c) in FIG. 6A shows an example of application to analysis of a mineral resource. Part (d) in FIG. 6A shows an example of application to identification of an insect species. In addition, the object recognition device 300 in the present embodiment is also effective to applications of, for example, security authentication or lock-release for face authentication or the like or human detection or the like. In the case of an ordinary monochrome image or an RGB image, there is a possibility that an object is misrecognized at a glance of the human eye. In contrast, addition of the multiple-wavelength information, as in the present embodiment, makes it possible to enhance the recognition accuracy of objects.

FIG. 6B shows an example in which detailed information of an object 70 is displayed on a smartphone in which the object recognition method in the present embodiment is implemented. In this example, the object recognition device 300 is incorporated into the smartphone. Only holding the smartphone up to the object 70 can identify what the object 70 is and can display the name and description information of the object 70 through collection thereof from a database over a network on the basis of the result of the identification. Thus, portable information equipment, such as a smartphone, can be utilized as an "image search encyclopedia". The "image search encyclopedia" may present a plurality of candidates in descending order of probabilities when complete identification is difficult. Data indicating the name and the description information of the object 70 may be obtained from a database on the basis of the recognition result of the object 70, and the name and/or the description information may be displayed on the display 400.

FIG. 6C shows an example in which objects that exist in a town are recognized by the smartphone. The object recognition device 300 is incorporated into the smartphone. When the object 70 has been identified, as in the case of an object to be inspected in a production line, an inspection device obtains only information on a particular wavelength corresponding to the object 70. On the other hand, under a situation in which the target of the object 70 is not identified, like those used in a town, obtaining multiple-wavelength information, as in the object recognition device 300 in the present embodiment, is effective. The object recognition device 300 may be arranged at the display 400 side of the smartphone or may be arranged at a surface at the opposite side of the display 400, depending on a use example.

In addition, the object recognition method in the present embodiment can be applied to a wide range of fields in which recognition using artificial intelligence (AI) is performed for map application, automated driving, car navigation, or the like. As described above, the object recognition device can also be incorporated into, for example, portable equipment, such as a smartphone, a tablet computer, or head-mounted display device. A human, a face, or a living body, such as animal, can also be the object 70 as long as it can be photographed with a camera.

The captured image 120 indicated by image data input to the signal processing circuit 200 is a multiplexed encoded image. Thus, it is difficult to determine what is shown in the captured image 120 at a glance. However, the captured image 120 includes feature information, which is information indicating features of the object 70. Accordingly, AI can recognize the object 70 directly from the captured image 120. This eliminates the need for image-reconstruction computational processing that spends a relatively large amount of time.

Second Embodiment

An object recognition device 300 according to a second embodiment is applied to a sensing device for automated driving. A detailed description of contents that are similar to those of the first embodiment is omitted below, and points that differ from the first embodiment will be mainly described.

Figure 7:
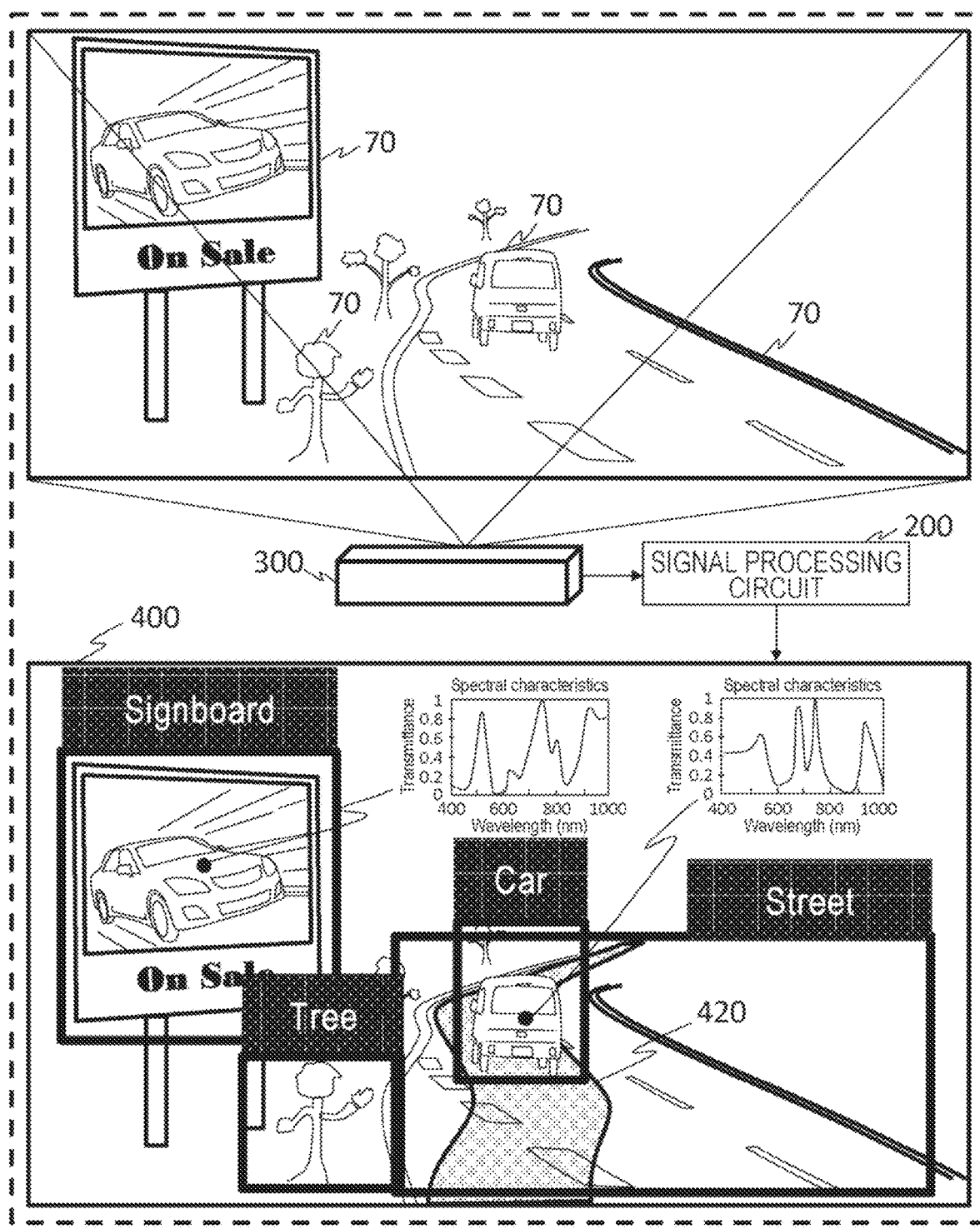
FIG. 7 is a view schematically showing an example of vehicle control using an object recognition device in an exemplary embodiment.

FIG. 7 is a view schematically showing an example of vehicle control using the object recognition device 300 in the present embodiment. By sensing the environment outside a vehicle, the object recognition device 300 incorporated into a vehicle can recognize one or more objects 70 in the vicinity of the vehicle within the field of view of the object recognition device 300. The objects 70 in the vicinity of the vehicle include, for example, an oncoming vehicle, a vehicle traveling side-by-side, a parked vehicle, a pedestrian, a bicycle, a road, a lane, a white line, a sidewalk, a curb, a ditch, a sign, a signal, a utility pole, a shop, a planted tree, an obstacle, or a falling object.

The object recognition device 300 includes an image capture device that is similar to that in the first embodiment. The image capture device generates image data for moving images at a predetermined frame rate. The image data shows a captured image 120 that is multiplexed and encoded, the image resulting from passage of light from the object 70 in the vicinity of the vehicle through the filter array 100C. The signal processing circuit 200 acquires the image data, extracts one or more objects 70 in the field of view from the image data, estimates what each of the extracted objects 70 is, and labels each object 70. Based on a recognition result of the object 70, the signal processing circuit 200 can, for example, comprehend the surrounding environment, determine a danger, or display a target travel trajectory 420. Data, such as the surrounding environment, danger information, and the target travel trajectory 420, can be used to control vehicle-mounted equipment, such as the steering or transmission in the vehicle body. This makes it possible to perform automated driving. An object recognition label or a recognition result of a traveling route may be displayed on the display 400 installed in the vehicle, as shown in FIG. 7, so as to be recognizable by a driver. The vehicle control method in the present embodiment includes controlling an operation of the vehicle to which the image capture device 150 is attached, based on a recognition result of the objects 70.

In object recognition using a conventional RGB or monochrome image, it is difficult to distinguish between a picture and a real thing. Thus, for example, there are cases in which a picture on a signboard or a poster and a real thing are misrecognized. However, by utilizing multiple-wavelength information, the object recognition device 300 can consider a spectrum distribution difference between paint on a signboard and the real thing. This makes it possible to improve the recognition accuracy. In addition, the object recognition device 300 acquires two-dimensional data in which multiple-wavelength information is superimposed. Thus, the amount of data is small compared with conventional three-dimensional hyperspectral data. As a result, it is possible to reduce the time taken for reading and transferring the data and the processing time of machine learning.

Also, other than misrecognition between a picture and a real thing, there are cases in which an object in a camera image is accidentally seen as another object. In the example shown FIG. 7, a roadside tree appears to be a human shape, depending on the degree of growth of the roadside tree or the viewing angle. Thus, in the conventional object recognition based on shapes, the roadside tree shown in FIG. 7 may be misrecognized as a human. In this case, under an automated-driving environment, an instruction for deceleration or sudden brake of the vehicle body can be issued upon misrecognizing that a person darts out. As a result, an accident can be caused. For example, on an expressway, a vehicle body should not stop suddenly owing to misrecognition. Under such an environment, by utilizing the multiple-wavelength information, the object recognition device 300 makes it possible to enhance the recognition accuracy compared with the conventional object recognition.

The object recognition device 300 can also be used in combination with various sensors for a millimeter-wave radar, a laser range finder (Lidar), a global positioning system (GPS), or the like. This makes it possible to further improve the recognition accuracy. For example, causing the object recognition device 300 to work in conjunction with pre-recorded road map information makes it possible to improve the accuracy of generating a target travel trajectory.

Third Embodiment

In a third embodiment, unlike the first embodiment, light sources having different light emission wavelength ranges, instead of the filter array 100C, are used to acquire encoded image data. A detailed description of contents that are similar to those of the first embodiment is omitted below, and points that differ from the first embodiment will be mainly described.

Figure 8:
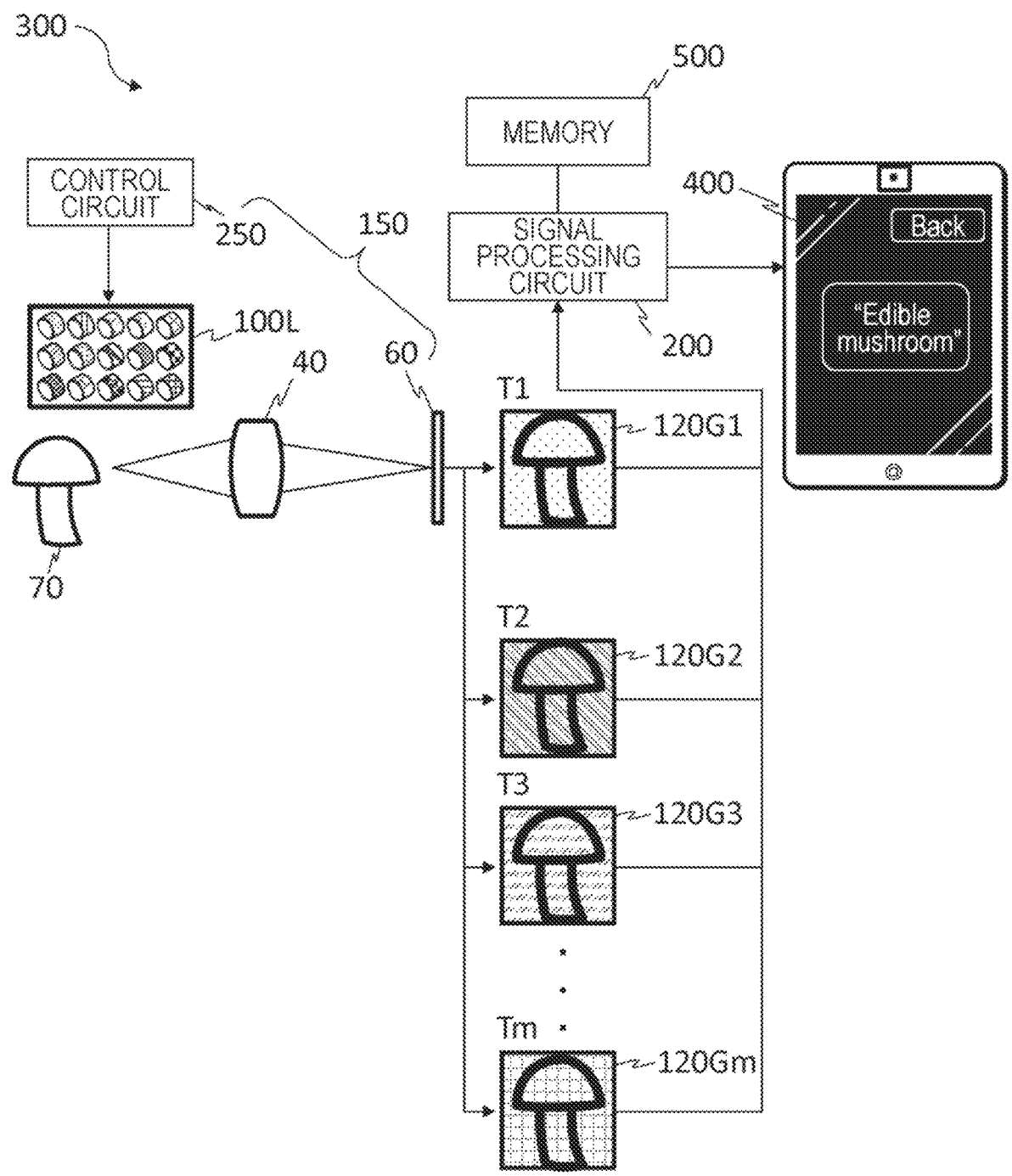
FIG. 8 is a view schematically showing an example of an object recognition device in an exemplary embodiment.

FIG. 8 is a view schematically showing an example of an object recognition device 300 in the present embodiment. The object recognition device 300 in the present embodiment includes the image capture device 150, the signal processing circuit 200, the display 400, and the memory 500. The image capture device 150 includes the optical system 40, the image sensor 60, a light source array 100L, and a control circuit 250.

The light source array 100L includes a plurality of light sources that emit light in wavelength ranges that are different from each other. The control circuit 250 controls the image sensor 60 and the plurality of light sources included in the light source array 100L. The control circuit 250 repeats an operation for causing the image sensor 60 to perform image capture a plurality of times in a state in which some or all of the plurality of light sources are made to perform light emission while changing a combination of the light sources that are made to perform the light emission. Thus, light having spectral characteristics that are different from each other are emitted from the light source array 100L for respective image captures. The combinations of the light sources that are made to perform the light emission do not include exactly the same combination. However, some of the light sources in two or more combinations of the combinations may overlap each other. Accordingly, captured images 120G1, 120G2, 120G3, . . . , and 120Gm acquired from the respective photographies at photography times T1, T2, T3, . . . , and Tm have different intensity distributions. In the present embodiment, the image data input to the signal processing circuit 200 is a collection of image signals generated for the respective image captures by the image sensor 60 in the image capture device 150.

Not only does the control circuit 250 change each light source to two values, that is, turning on or turning off, but also the control circuit 250 may adjust the amount of light of each light source. When such adjustment is performed, it is also possible to obtain image signals having different wavelength information. Each light source can be, for example, a light-emitting diode (LED), a laser diode (LD), a laser, a fluorescent lamp, a mercury-vapor lamp, a halogen lamp, a metal halide lamp, or a xenon lamp and is not limited thereto. Also, for emitting light in a terahertz-order wavelength range, ultra-high-speed fiber lasers, such as femtosecond lasers, can be used as the light sources.

The signal processing circuit 200 performs learning and classification on the object 70 by using all or any of the captured images 120G1, 120G2, 120G3, . . . , and 120Gm included in the image data.

The control circuit 250 may cause the light source array 100L to emit not only light having a spatially uniform illuminance distribution but also, for example, light having a spatially random intensity distribution. The light emitted from the light sources may have two-dimensional illuminance distributions that differ for respective wavelengths. As shown in FIG. 8, an optical image that passes the optical system 40 after the light is emitted from the light source array 100L toward the object 70 is formed on the image sensor 60. In this case, light that is incident on each pixel or two or more pixels in the image sensor 60 has spectral characteristics including different spectral peaks, as in the example shown in FIG. 2. This makes it possible to perform object recognition with a single shot, as in the first embodiment.

Pieces of image data for learning which are included in the training datasets include image data for learning which are generated by the image capture device 150 or another image capture device, as in the first embodiment. When the image data for learning is generated by another image capture device, the other image capture device can include a light source array having characteristics that are equivalent to those of the light source array 100L included in the image capture device 150. When image data to be recognized and the pieces of image data for learning are encoded by a light source array having the equivalent characteristics, a high recognition accuracy of the object 70 is obtained.

The object recognition method in the present disclosure includes: acquiring image data in which pieces of wavelength information are multiplexed in each pixel; and applying a classification model that has performed learning with a machine-learning algorithm to the image data in which the pieces of wavelength information are multiplexed, to thereby recognize an object included in a scene shown by the image data. Also, the object recognition method in the present disclosure includes reinforcing classification model learning by using the image data in which the pieces of wavelength information are multiplexed. Means for acquiring the image data in which the pieces of wavelength information are multiplexed in each pixel is not limited to the image capture device described in the above-described embodiments.

The present disclosure also includes a program and a method that define the operations executed by the signal processing circuit 200.

The object recognition device in the present disclosure can be used for measurement equipment for identifying a target object with high accuracy during measurement. The object recognition device can also be applied to, for example, identification of the types of plant, food, or living thing, road guidance or navigation, mineral exploration, sensing for living body, medical care, or beauty care, an inspection system for foreign matter and residual agricultural chemicals in food, remote sensing systems, and vehicle-mounted sensing systems for automated driving and so on.

What is claimed is:

1. An object classification method comprising:
acquiring image data of an image including feature information indicating a feature of an object; and
classifying the object included in the image, based on the feature information, by applying a classification model trained with a machine-learning algorithm to the image data that is data of a multiplexed image in which a plurality of wavelength information are multiplexed in one pixel, wherein:
the classification model is trained to output a classification result without reconstructing individual images in the plurality of wavelength information from the image data, the image data is acquired by causing a first image capture device to capture the image,
the first image capture device including:
an image sensor including a pixel; and
a filter array that is arranged between the object and the image sensor and includes translucent filters two-dimensionally arrayed, the image sensor detecting light transmitted through the filter array, the translucent filters including two or more filters in which wavelength dependencies of light transmittances are different from each other, light transmittance of each of the two or more filters having local maximum values in a plurality of wavelength ranges, and light detected by the pixel and converted to the image data has the plurality of wavelength ranges corresponding to the local maximum values.

2. The object classification method according to claim 1, wherein the classification model has trained with first training datasets, each of the first training datasets including learning image data for learning and label data for identifying the object included in a learning image for learning, the learning image being indicated by the learning image data for learning.

3. The object classification method according to claim 2, further comprising:
causing the classification model to perform further learning with a second training dataset including the image data and second label data for identifying the object.

4. The object classification method according to claim 2, wherein the image data for learning is acquired by capturing an image of the object in a state in which the object occupies a predetermined range or more in the image for learning.

5. The object classification method according to claim 2, wherein pieces of learning image data for learning which are included in the first training datasets include learning image data for learning which is generated by a second image capture device that is different from the first image capture device.

6. The object classification method according to claim 5, wherein the second image capture device includes a filter array having a characteristic that is equivalent to a characteristic of the filter array in the first image capture device.

7. The object classification method according to claim 2, wherein:
learning images for learning are included in pieces of learning image data for learning which are included in the first training datasets, and
positions of the object in the learning images for learning are different from each other in the pieces of learning image data for learning.

8. The object classification method according to claim 1, wherein the acquiring of the image data is performed using an image capture device including a display, and the object classification method further comprises displaying, on the display, an auxiliary representation for notifying a user of an area where the object is to be located or a range to be occupied by the object in the image, before the image data is acquired.

9. The object classification method according to claim 1, wherein the translucent filters are different from each other in the wavelength dependencies of the light transmittances, and the light transmittance of each of the translucent filters has local maximum values in a plurality of wavelength ranges.

10. A vehicle control method using the object classification method according to claim 1, the vehicle control method comprising:

controlling an operation of a vehicle, based on a result of the classifying of the object, wherein the first image capture device is attached to the vehicle.

11. An information display method using the object classification method according to claim 1, the information display method comprising:

acquiring, from a database, data indicating at least one selected from the group consisting of a name of the object and a description of the object, based on a result of the classifying of the object; and displaying, on a display, the at least one selected from the group consisting of the name of the object and the description of the object.

12. An object classification device comprising:

an image sensor that generates image data of an image including feature information indicating a feature of an object and includes a pixel;

a filter array that is arranged between the object and the image sensor and that includes translucent filters two-dimensionally arrayed, the image sensor detecting light transmitted through the filter array, the translucent filters including two or more filters in which wavelength dependencies of light transmittances are different from each other, light transmittance of each of the two or more filters having local maximum values in a plurality of wavelength ranges; and a signal processing circuit that classifies the object included in the image, based on the feature information, by applying a classification model trained with a machine-learning algorithm to the image data that is data of a multiplexed image in which a plurality of wavelength information are multiplexed in one pixel, wherein:

the classification model is trained to output a classification result without reconstructing individual images in the plurality of wavelength information from the image data, and light detected by the pixel and converted to the image data has the plurality of wavelength ranges corresponding to the local maximum values.

* * * * *